Aug. 16, 1966     N. ALPERT ETAL     3,267,436
ELECTRONIC ORDERING, PRICE COMPUTING AND BILLING SYSTEM
Filed Aug. 24, 1962     23 Sheets-Sheet 1

FIG.1

SERIAL NO.

| x | TAKEOUT      LOCATION | 245 |

Item quantity

| 5 | COFFEE | 0.50 |
| 3 | COKE | 0.45 |
|   | ROOT BEER | |
|   | MILK | |
|   | ICED TEA (HOT CHOC.) | |

HOT DOG
TOASTED CHEESE SANDWICH
HAM SANDWICH
CHOC. SHAKE

APPLE PIE

LEMONADE
SUNDAE

HAMBURGER PL.

FISH PLATTER

} Item cost

☐ GUESTS
☐ SERVER

TOTAL     0.95

INVENTORS
NORMAN ALPERT
ROBERT M. BERLER
RALPH TOWNSEND

BY

ATTORNEY

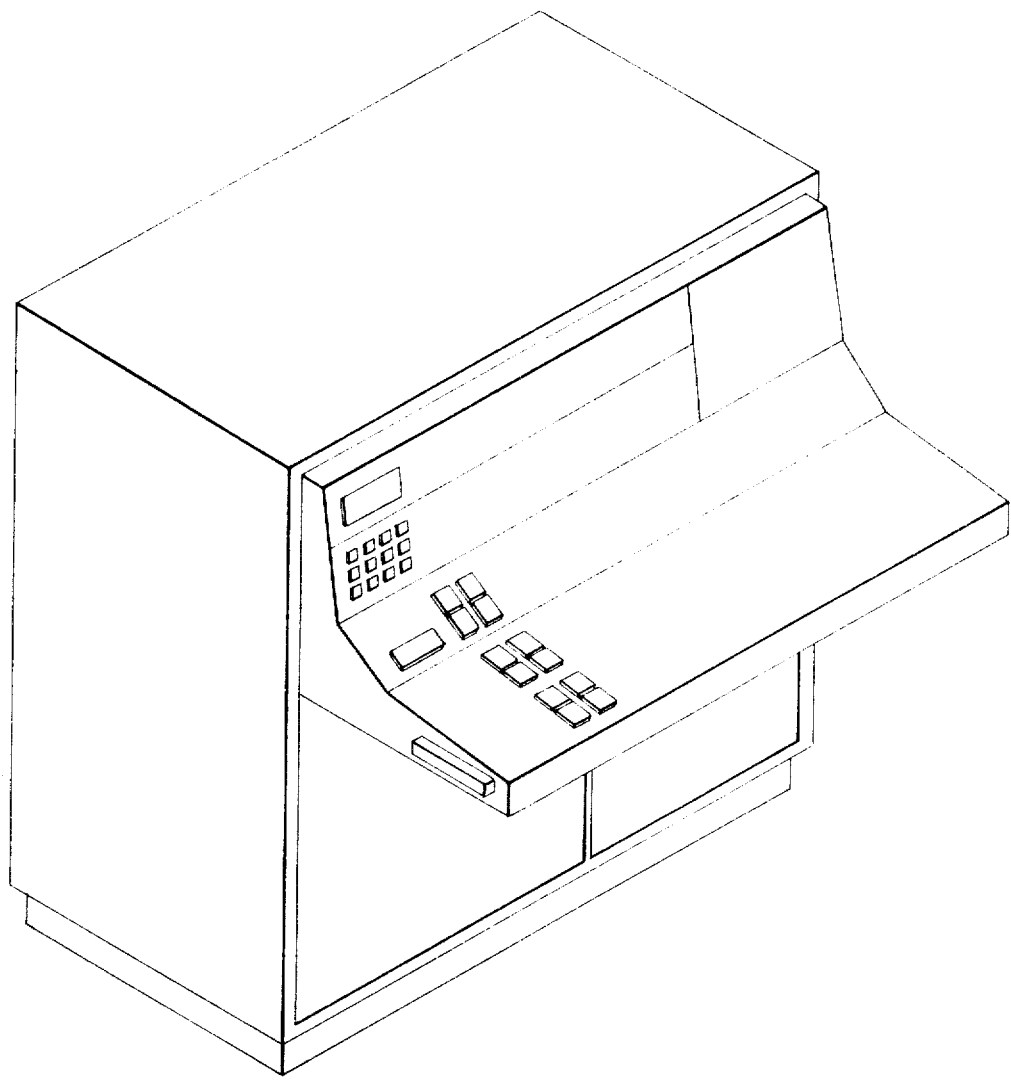

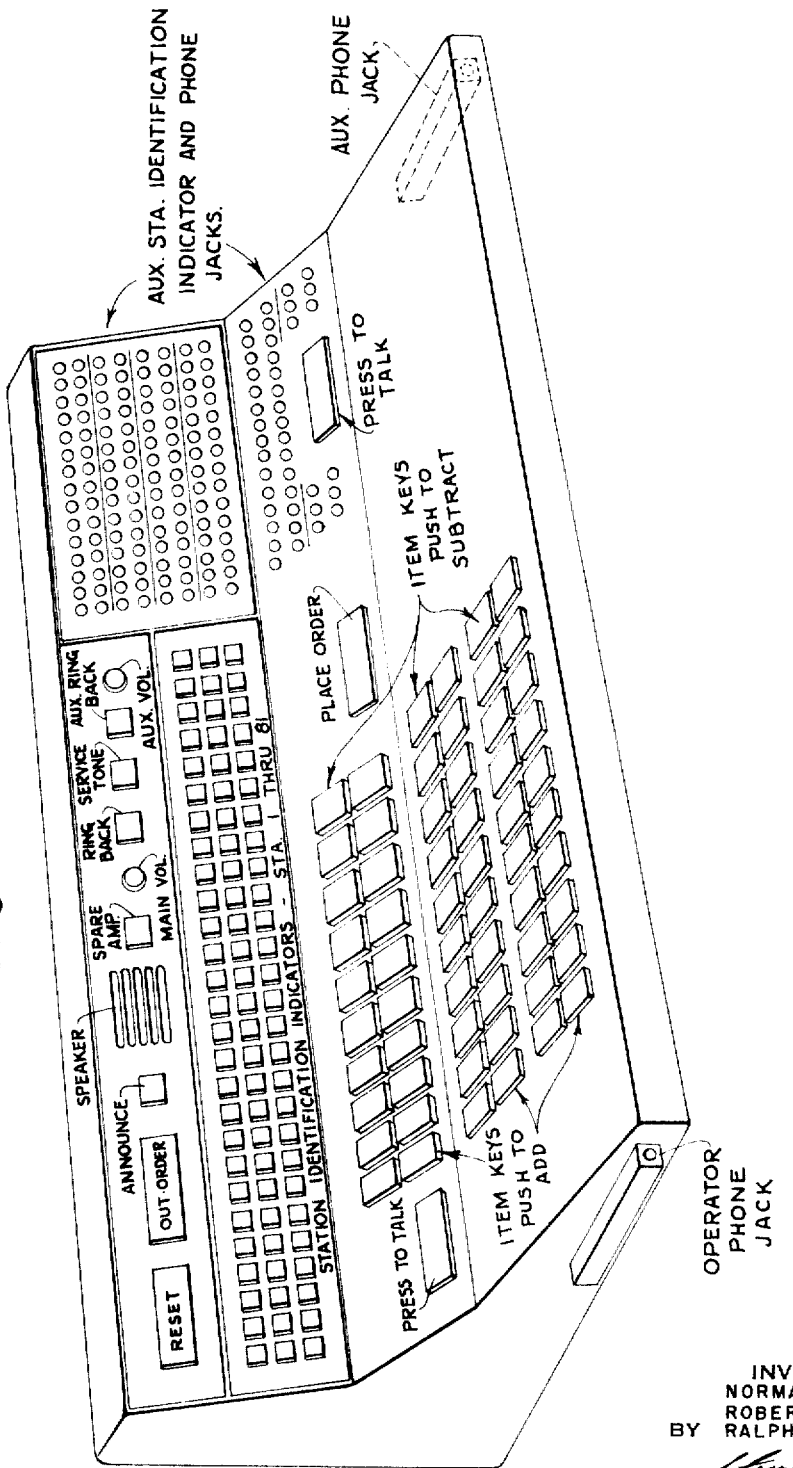

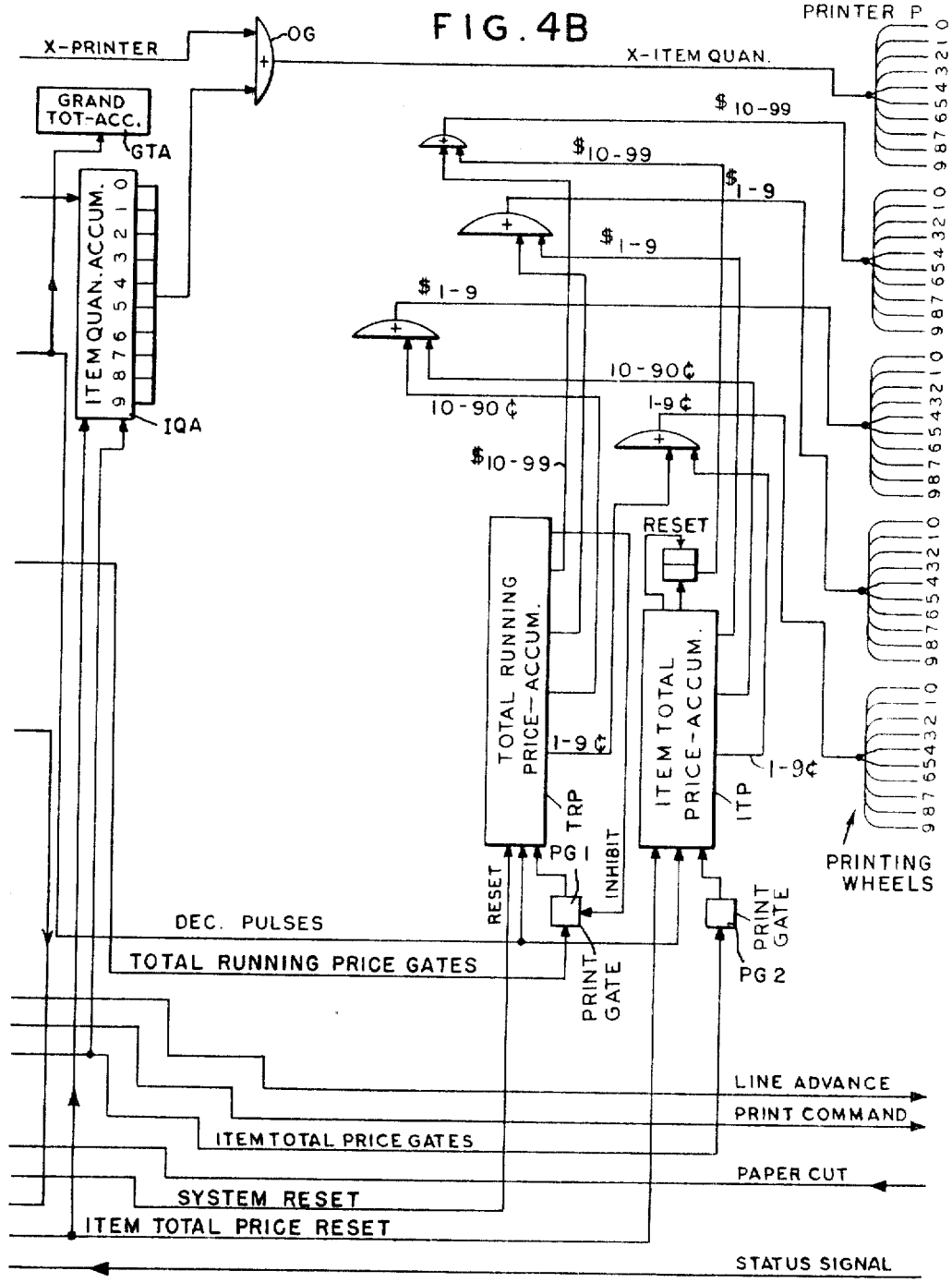

Aug. 16, 1966   N. ALPERT ETAL   3,267,436
ELECTRONIC ORDERING, PRICE COMPUTING AND BILLING SYSTEM
Filed Aug. 24, 1962   23 Sheets-Sheet 6

INVENTORS
NORMAN ALPERT
ROBERT M. BERLER
RALPH TOWNSEND
BY
*Stuart F. Moore*
ATTORNEY Aug. 16, 1966   N. ALPERT ETAL   3,267,436
ELECTRONIC ORDERING, PRICE COMPUTING AND BILLING SYSTEM
Filed Aug. 24, 1962   23 Sheets-Sheet 8

SCANNER STEP TIMING SEQUENCE.

TIMING SEQUENCE OF FRONT END LOGIC.

INVENTORS
NORMAN ALPERT
ROBERT M. BERLER
RALPH TOWNSEND
BY
ATTORNEY

Aug. 16, 1966   N. ALPERT ETAL   3,267,436
ELECTRONIC ORDERING, PRICE COMPUTING AND BILLING SYSTEM
Filed Aug. 24, 1962   23 Sheets-Sheet 9

INVENTORS
NORMAN ALPERT
ROBERT M. BERLER
RALPH TOWNSEND
BY
ATTORNEY

INPUT | GATES | OUTPUT

Aug. 16, 1966

N. ALPERT ETAL 3,267,436

ELECTRONIC ORDERING, PRICE COMPUTING AND BILLING SYSTEM

Filed Aug. 24, 1962

INVENTORS
NORMAN ALPERT
ROBERT M. BERLER
BY RALPH TOWNSEND

ATTORNEY

Aug. 16, 1966 N. ALPERT ET AL 3,267,436
ELECTRONIC ORDERING, PRICE COMPUTING AND BILLING SYSTEM
Filed Aug. 24, 1962 23 Sheets-Sheet 15

INVENTORS
NORMAN ALPERT
ROBERT M. BERLER
BY RALPH TOWNSEND
ATTORNEY

FIG. 18

Aug. 16, 1966 N. ALPERT ETAL 3,267,436
ELECTRONIC ORDERING, PRICE COMPUTING AND BILLING SYSTEM
Filed Aug. 24, 1962 23 Sheets-Sheet 17

INVENTORS
NORMAN ALPERT
ROBERT M. BERLER
BY RALPH TOWNSEND

ATTORNEY

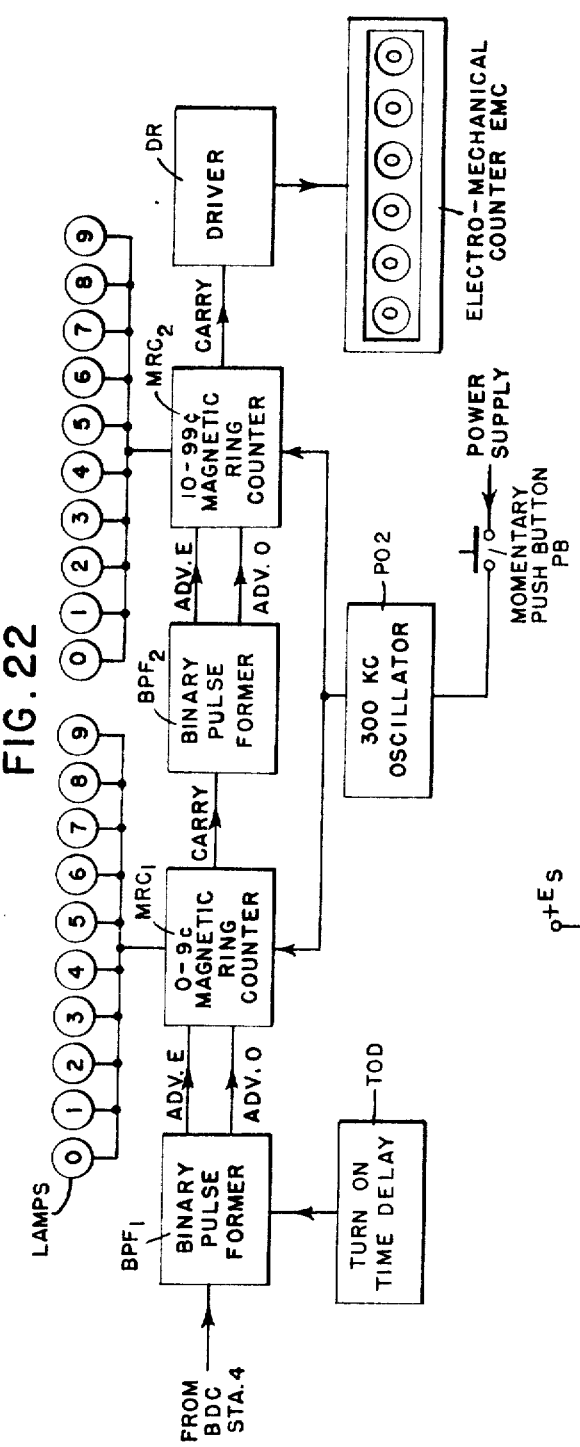
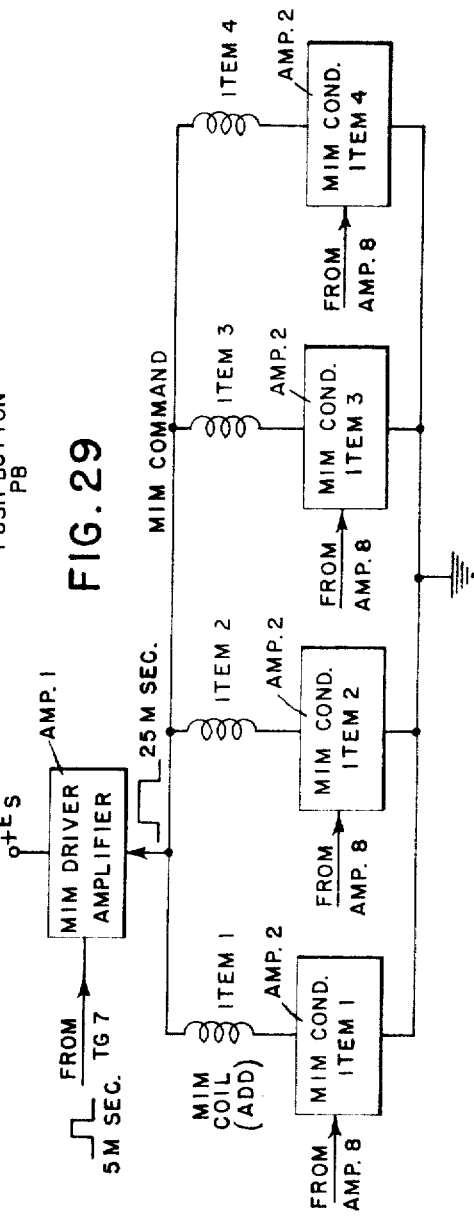

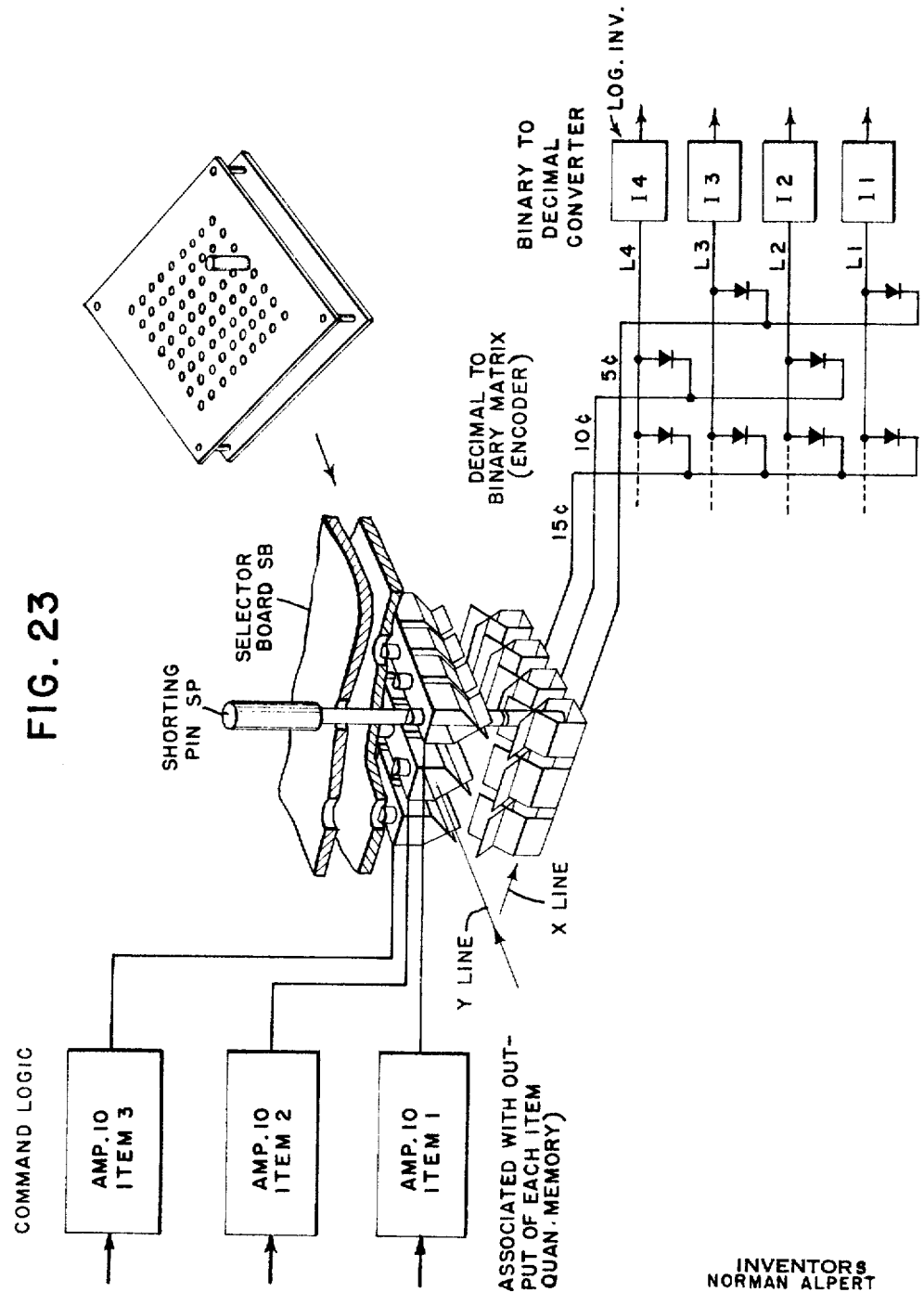

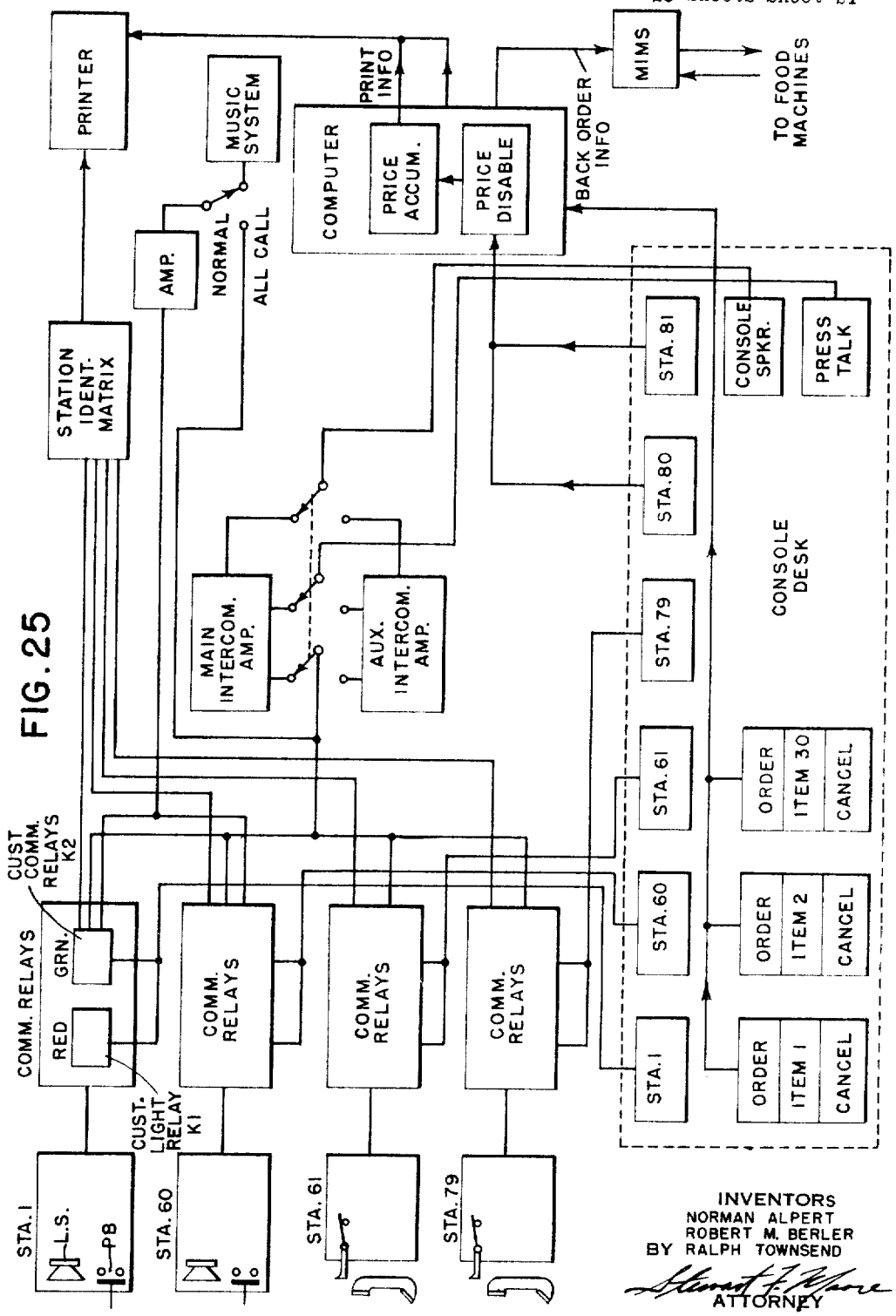

Aug. 16, 1966     N. ALPERT ET AL     3,267,436
ELECTRONIC ORDERING, PRICE COMPUTING AND BILLING SYSTEM
Filed Aug. 24, 1962     23 Sheets-Sheet 22

STATION IDENTIFICATION GATE

INVENTORS
NORMAN ALPERT
ROBERT M. BERLER
BY RALPH TOWNSEND

ATTORNEY

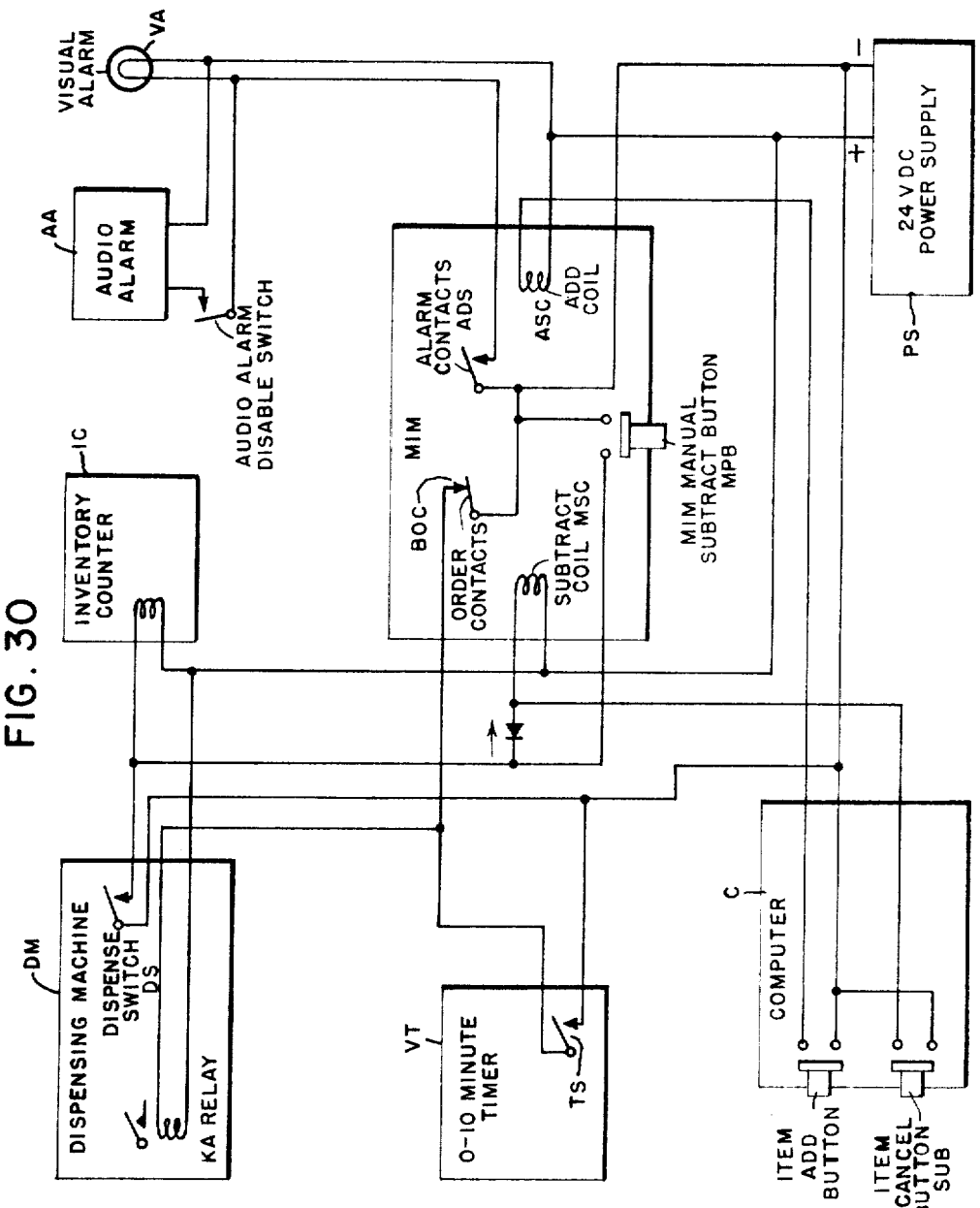

United States Patent Office 3,267,436
Patented August 16, 1966

3,267,436
ELECTRONIC ORDERING PRICE COMPUTING
AND BILLING SYSTEM
Norman Alpert, Scarsdale, N.Y., and Robert M. Berler,
Westport, and Ralph Townsend, Darien, Conn., assignors to Americal Machine & Foundry Company, a corporation of New Jersey
Filed Aug. 24, 1962, Ser. No. 219,222
7 Claims. (Cl. 340—172.5)

The invention relates to business accounting systems or machines and particularly to an electronic ordering, price computing the billing system or machine and its application to automated restaurants and other automated business establishments, and to the electronic control circuit arrangements used therewith.

It is particularly adapted for, and will be described hereinafter as applied to, an automatic restaurant of the drive-in type. However, it may also be used in restaurants of other types and in other business establishments dealing with sales each of a limited number of commodities to the general public and in which the volume of business and close competition requires that the ordering, preparation of customer bills and making records of the transactions for inventory and other business purposes must be expedited with the use of limited personnel, to reduce the operating costs of the business.

An object of the invention is to improve such systems or machines for economy of manufacture, speed and efficiency of operation, low maintenance costs and small space requirements.

Another object is to provide an electronic business system or machine that will take orders from customers for a number of commodity items, sample the information corresponding to the quantity of each of the items, compute quantity and total cost of each of the items on the order and the total cost of the order, store this information and supply it to a fast-operating commercial electromechanical printer in suitable form to cause operation thereof to produce a customer's bill with a description of all the items on the order, item quantities and prices, total order price and other pertinent order information.

A further object is to provide a machine or system which in addition to the above functions will produce and send back-order signal and inventory information to the individual commodity dispensing or fabricating machines.

Another object is to provide with a single computer operating on a time-sharing basis quickly and economically the ordering, pricing and billing operations involved in the supply and sale of any number of different commodity items to different customers.

Further objects are to provide a special purpose price computing and billing machine that in combination with a commercial electro-mechanical printing device will perform the following major functions:

(1) Provide item-quantity multiplied by item-price totals;
(2) Provide an item total price;
(3) Provide a total running price;
(4) To command the printer to advance the bill without printing if no item prices are to be printed, as well as at the end of the bill to provide proper length;
(5) To command the printer to provide automatic cutting of the bill;
(6) To read item quantities into a back-ordering system, thereby programming the equipment which must assemble or fabricate the items on the orders;
(7) To provide a confidential visual running grand total of each day's, week's or year's business; and
(8) To provide inventory control information from the machine.

Another object is to electrically control the starting, stopping and time of operation of one or more food dispensing machines.

Another object is to control one or more food dispensing or fabricating devices, to count the food items dispensed or fabricated thereby for a given order or orders for any given time interval.

Another object is to permit use of portions of the computer on failure of other portions.

The basic concept and philosophy of the electronic ordering, price computing and billing system for accomplishing the above objects is to use one main computer on a time-sharing basis with reliability and economy. In addition to making price and totalizing computations, the system is adapted to supply back-order information to the various separate dispensing or fabricating mechanisms and furnish further records useful for inventory and cost accounting information.

The system has no moving parts other than push buttons and the printer with which it is used, and computations and functions are accomplished with speed and reliability over long periods of operation with minimum maintenance.

A preferred embodiment of the invention comprises, at the operator's station, a console including all of the electronic equipment, which is push button controlled and capable of operation by an operator to take orders from customers for various items, to scan all items to determine those which have been ordered, make the price and totalizing computations and process this information for operating a high speed commercial printer to produce a customer's bill complete with ordered items by name (which are preprinted on the bill), item total prices and the total prices of the order with other pertinent order information, such as the customer's station and a taken out indication so that the order will be wrapped, rather than assembled for immediate consumption.

When the invention is adapted to an automatic drive in restaurant, suitable equipment is provided at the console and various customer stations for necessary communication between the operator or operators and the customers; also to provide suitable interlocking between the communication and computer equipments; and to provide for transmission of station identification, take out and no charge information to the printer for use in printing of customer's bills.

The console also includes suitable logic equipment to provide command pulses for controlling the printer, line advance and paper-cut operations thereof, the scanner, the accumulators and other functional sections of the system to control operation thereof, and for receiving return signals from the printer and the other parts of the system.

The above and other objects and features of the invention will be better understood from the following detailed description thereof when read in conjunction with the various figures of the accompanying drawings in which:

FIG. 1 shows a typical bill produced in accordance with the invention;

FIG. 2 is an outline in perspective of an operator's console housing the electronic circuits in accordance with the invention;

FIG. 3 is a perspective view of the operator's keyboard or the console of FIG. 2;

Figure 4A:
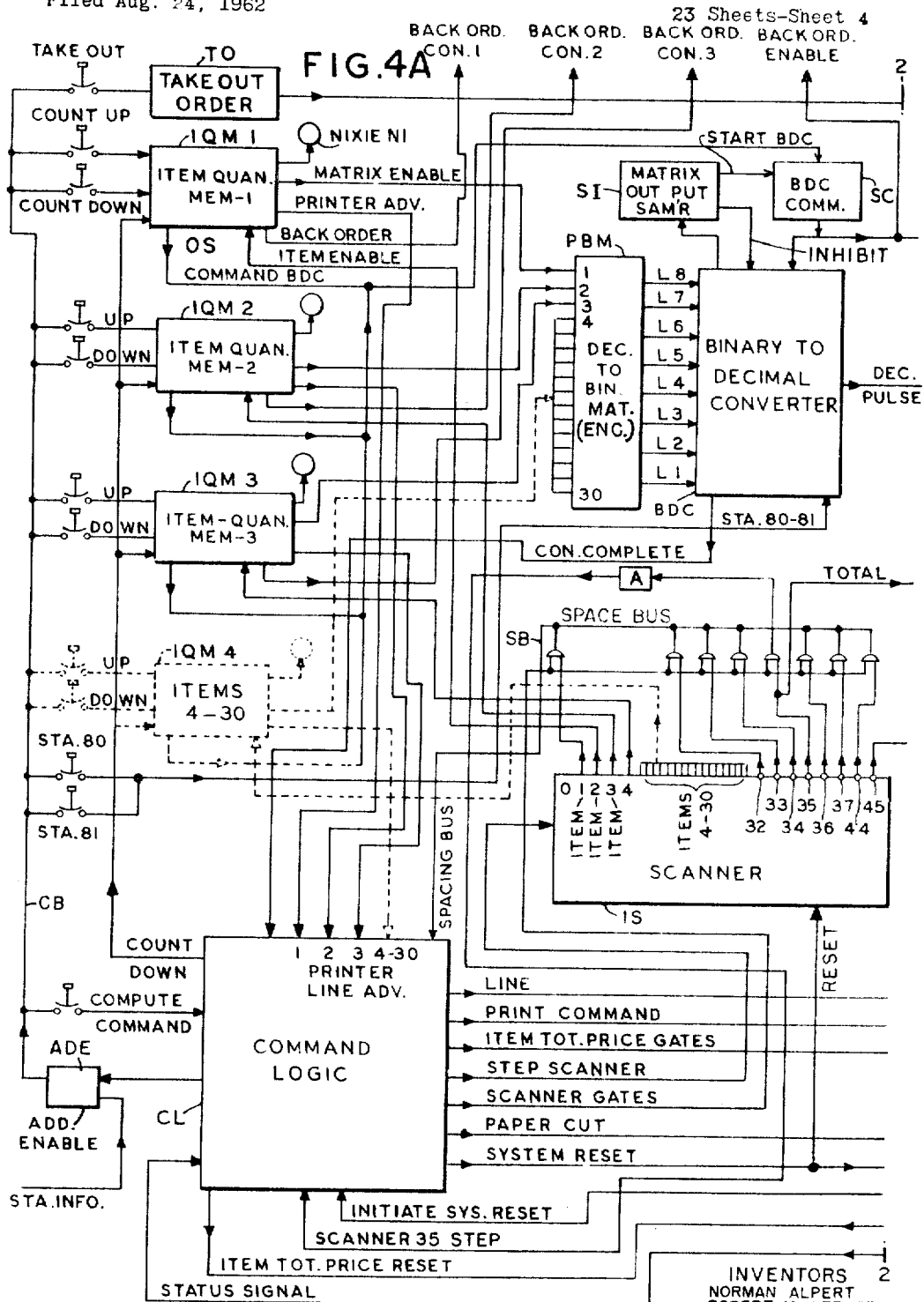
Figure 5:
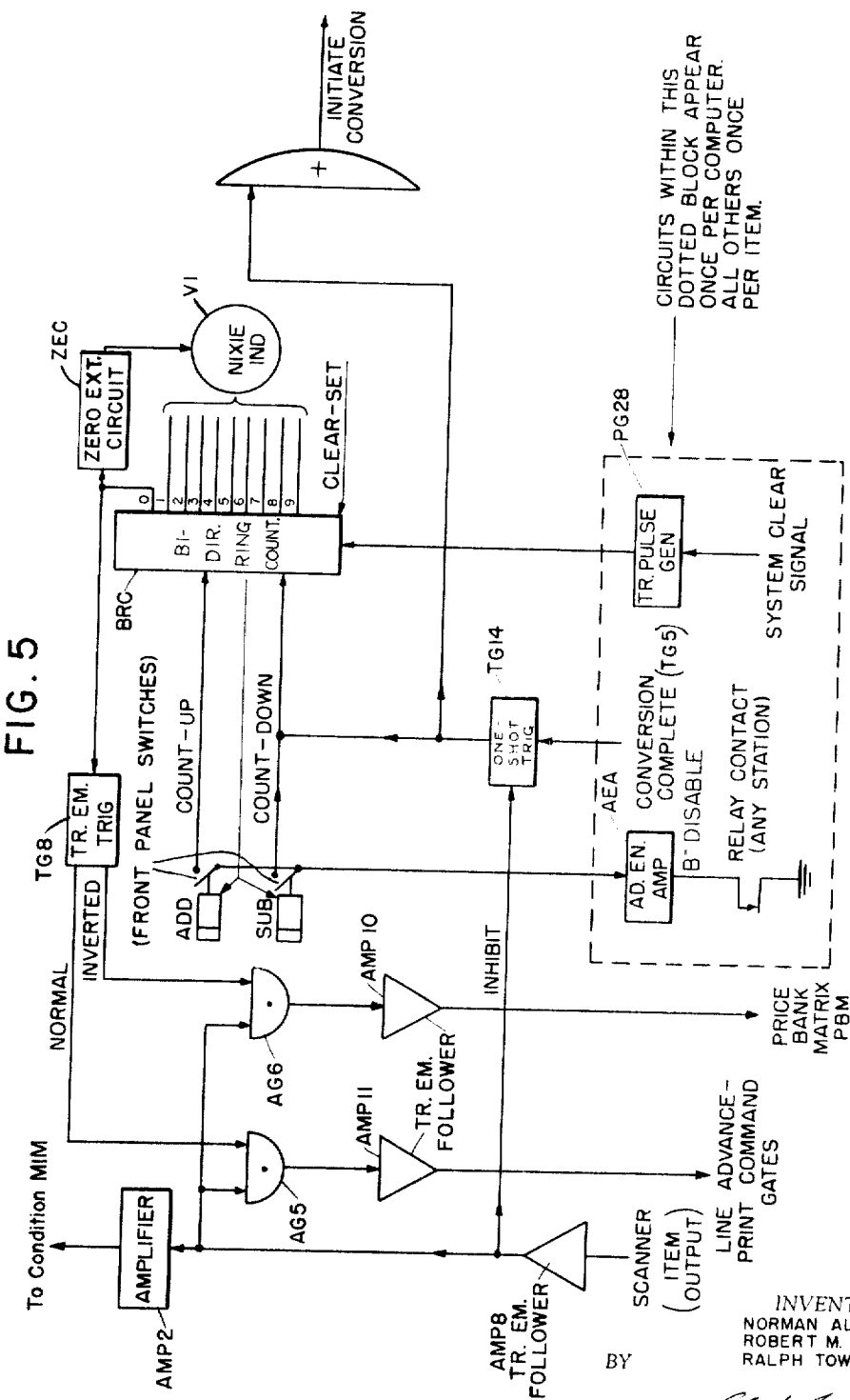
Figure 6:
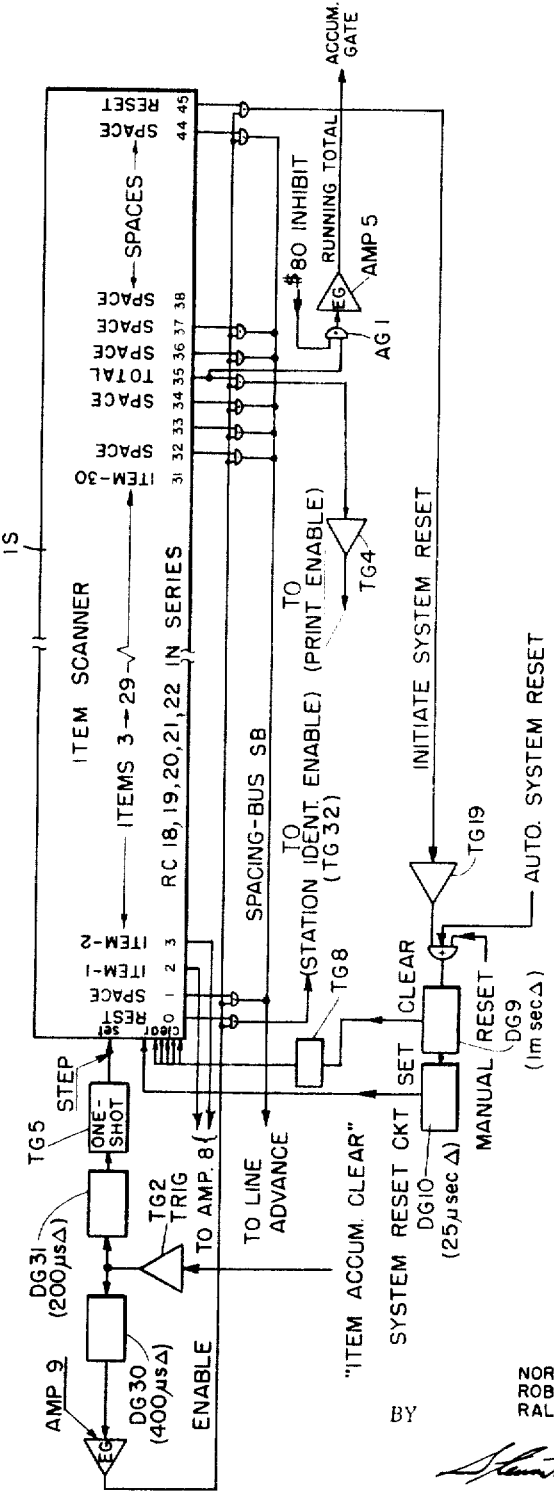
Figure 7:
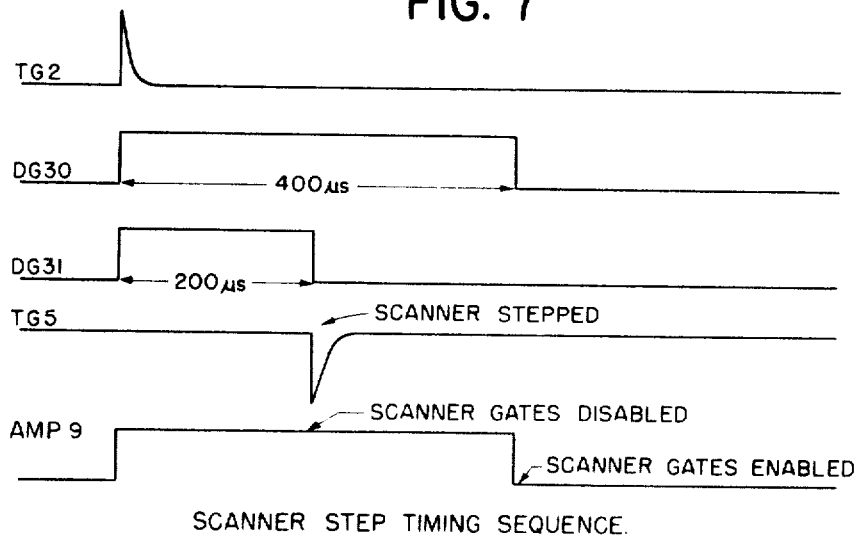
Figure 16:
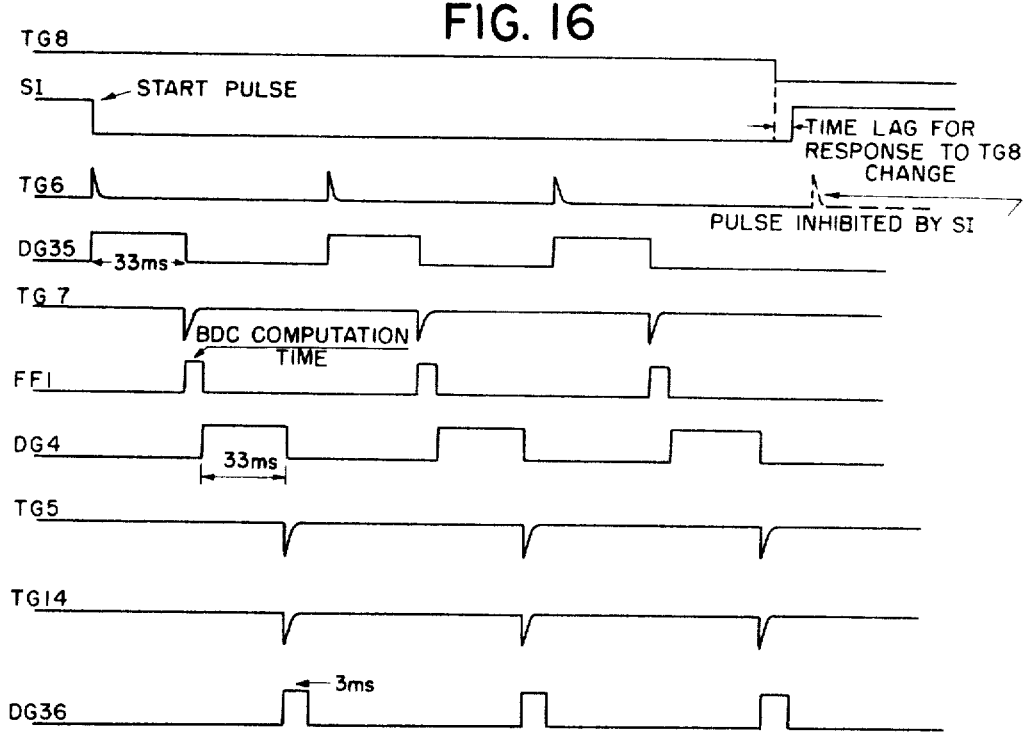
Figure 8:
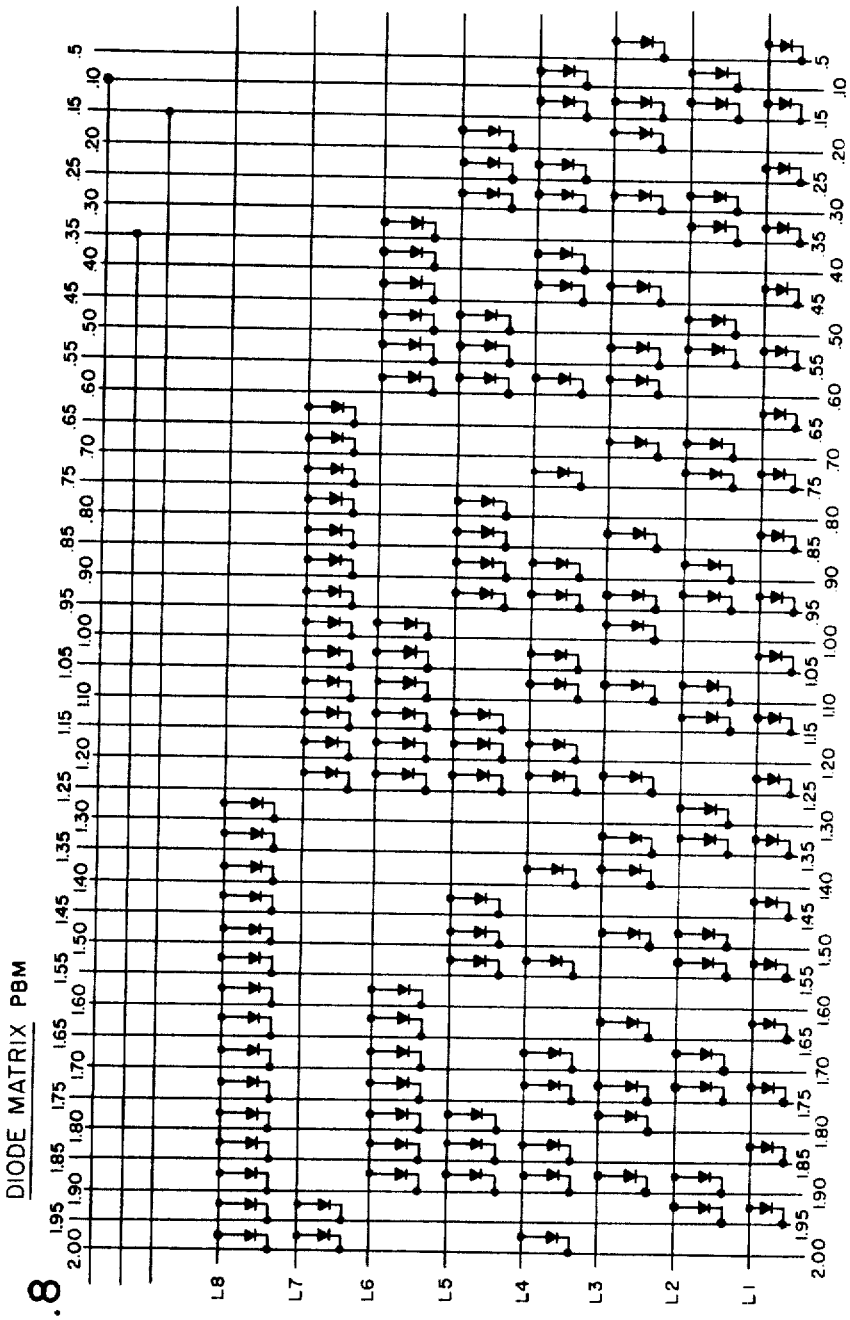
Figure 10:
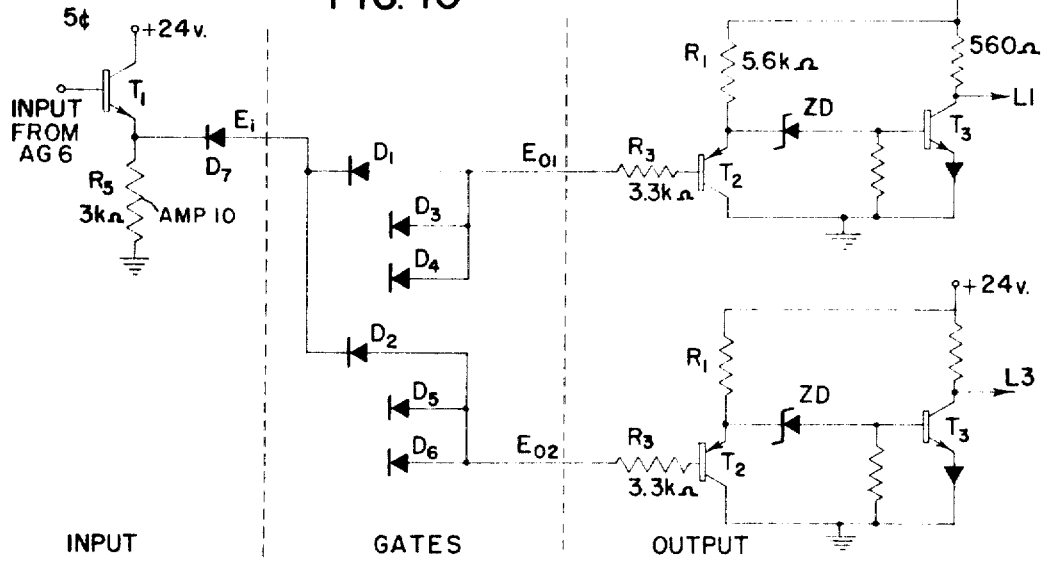
Figure 11:
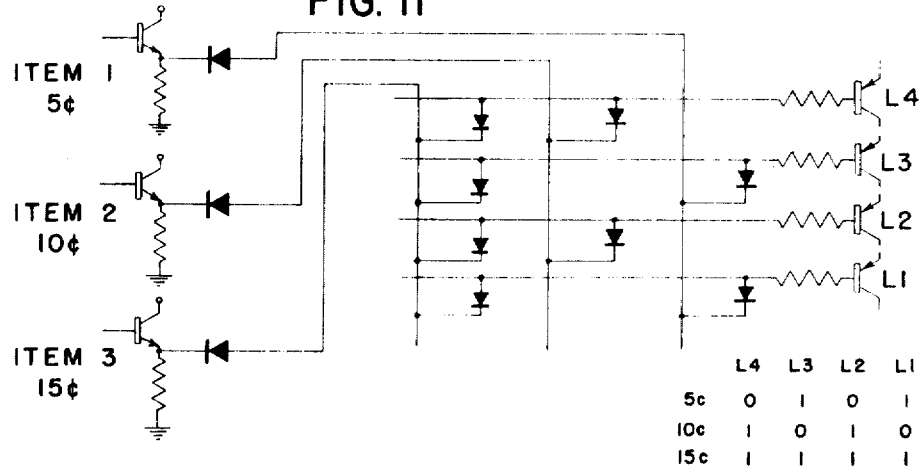
Figure 9:
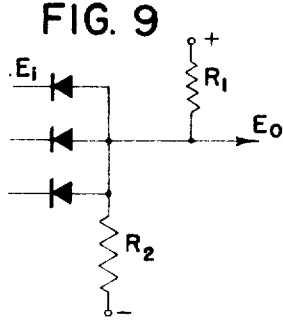
Figure 12A:
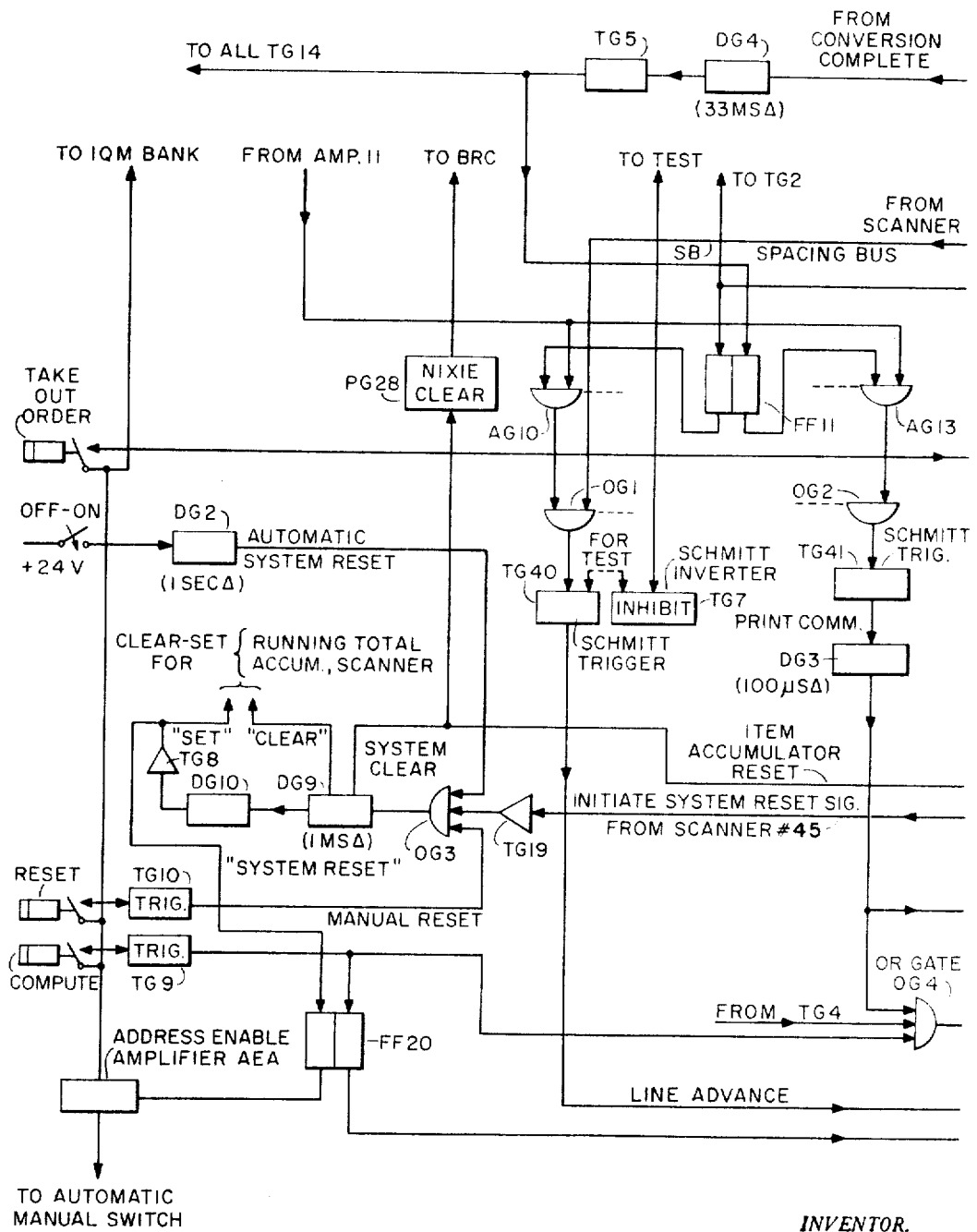
Figure 12B:
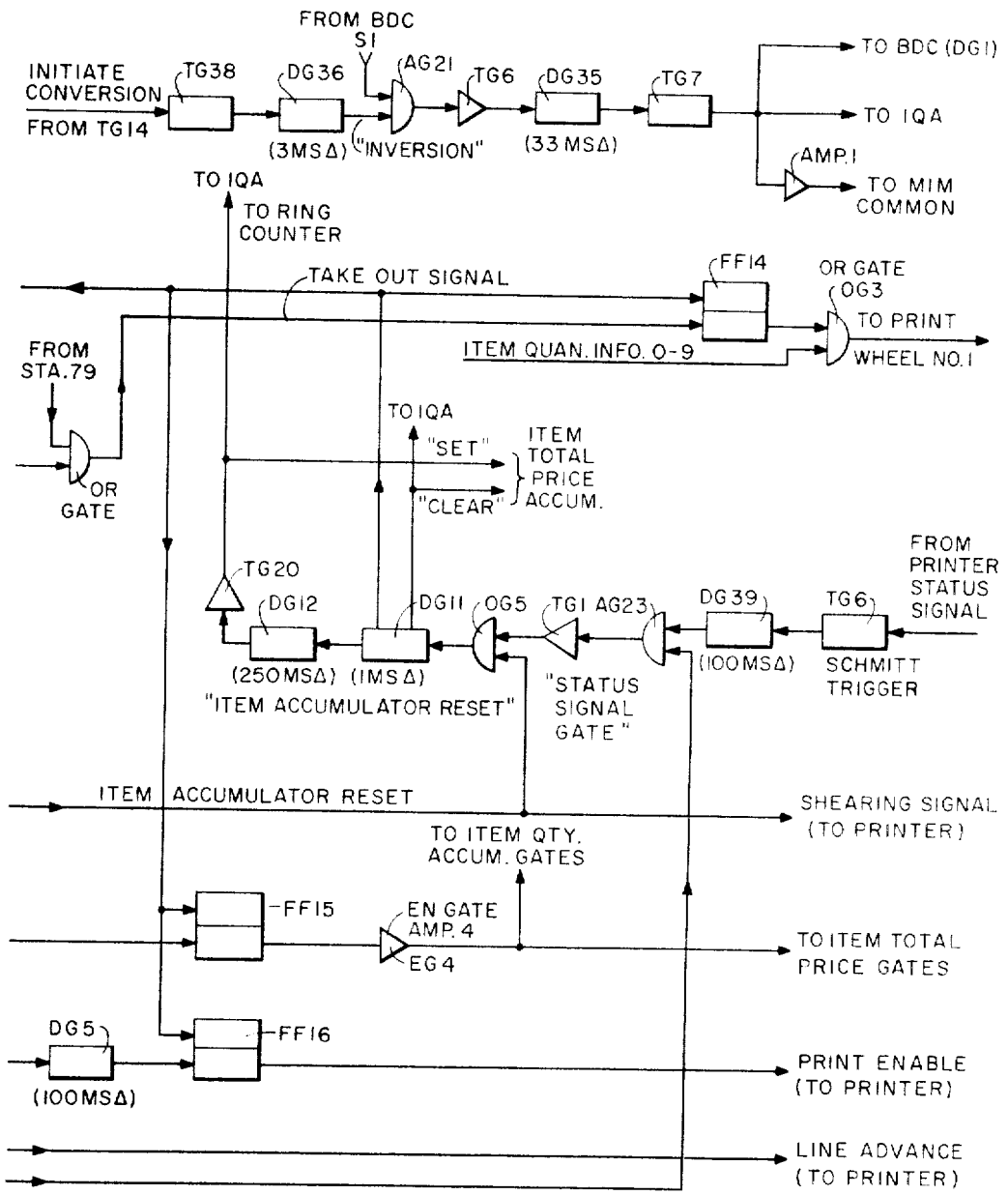
Figure 13:
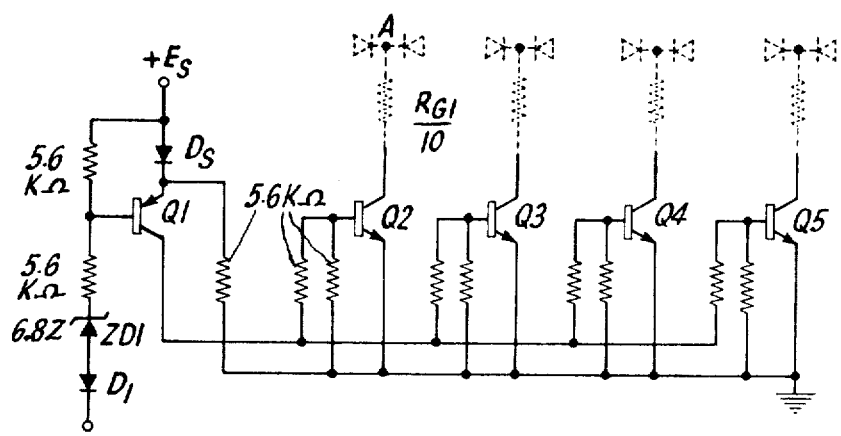
Figure 31:
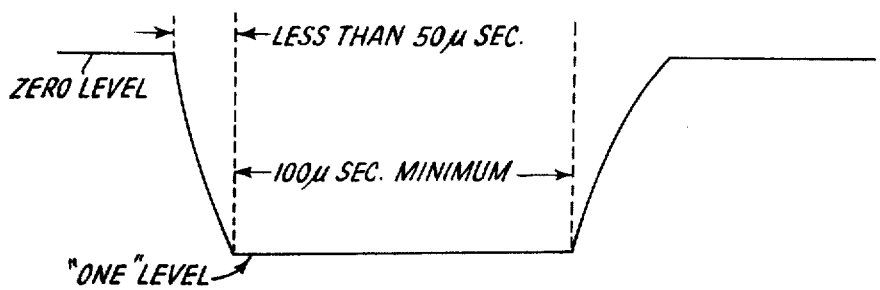
Figure 14:
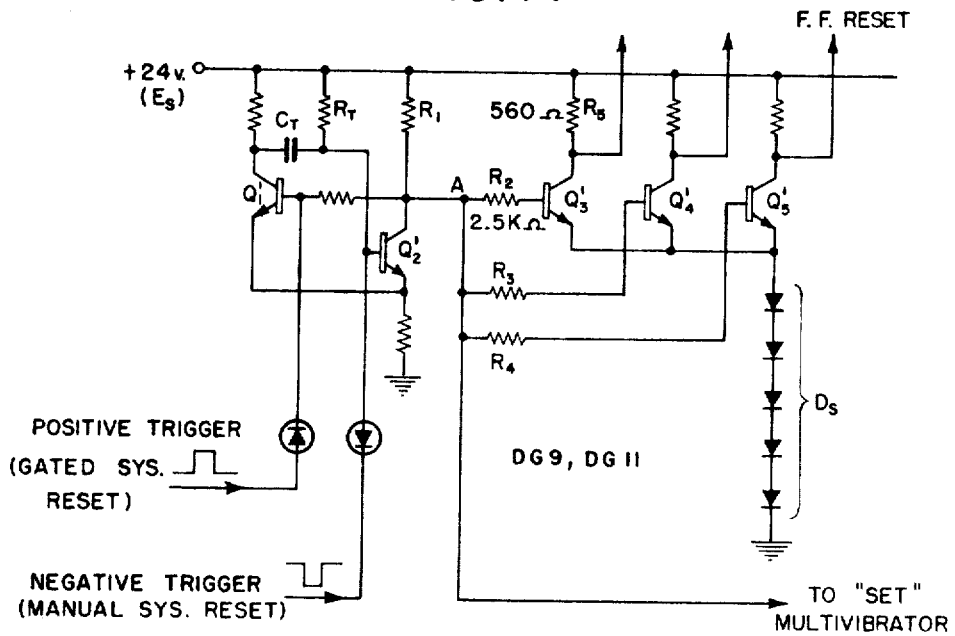
Figure 15:
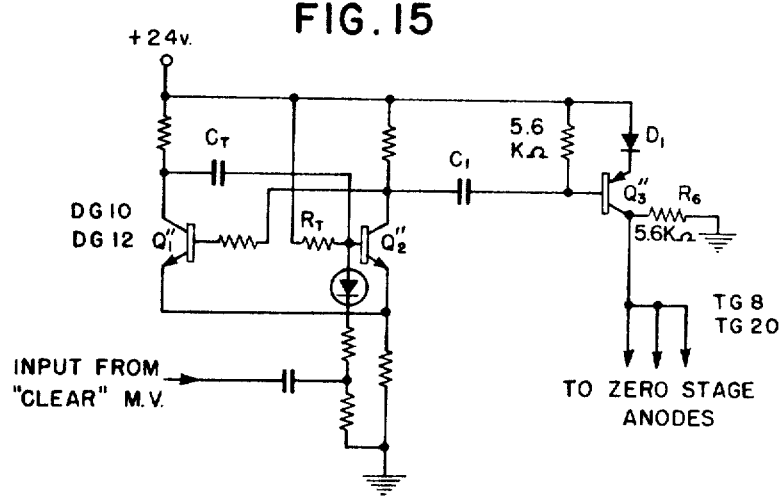
Figure 17:
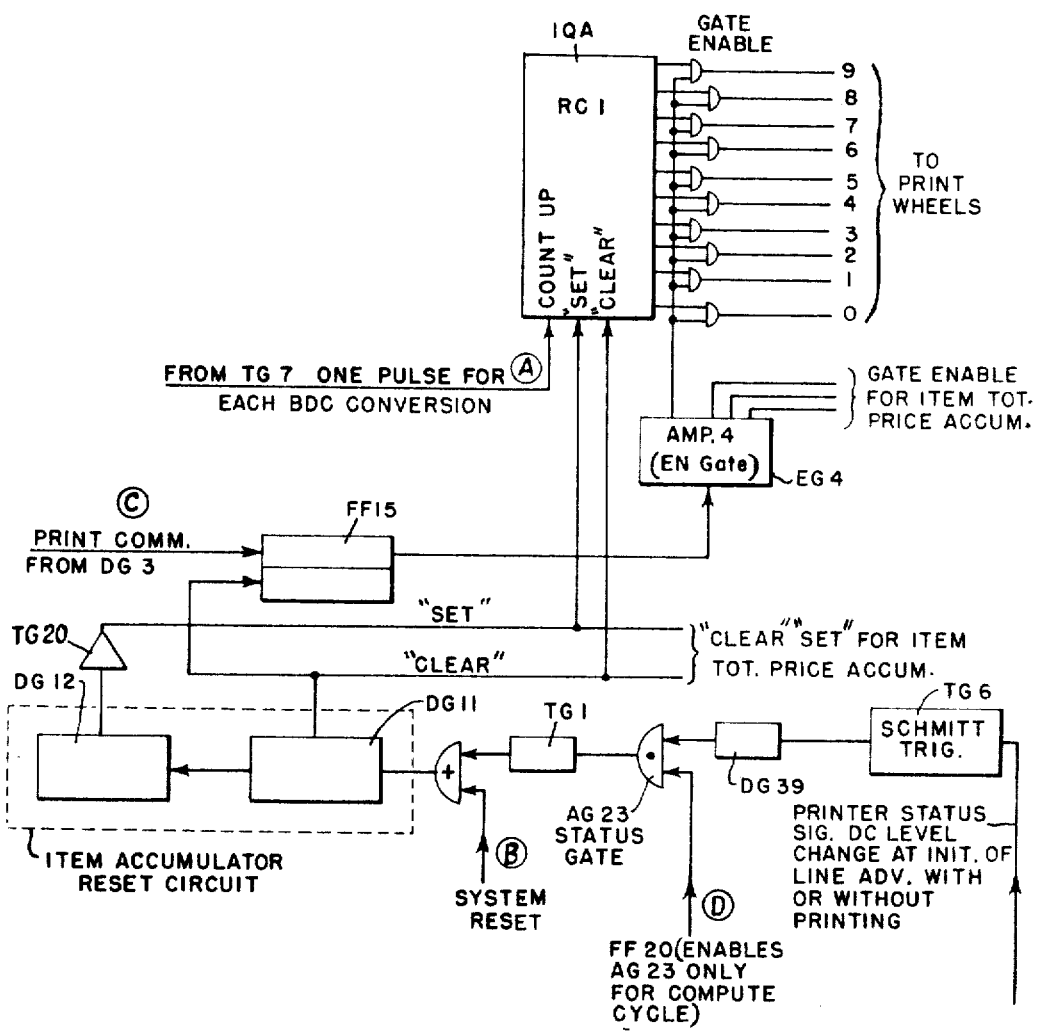
Figure 21:
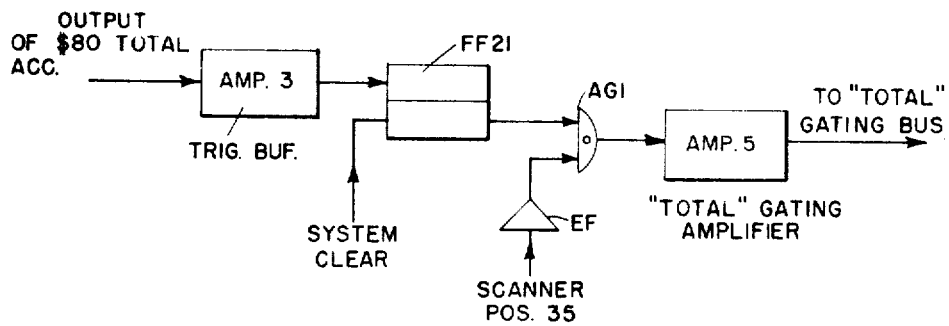
Figure 19:
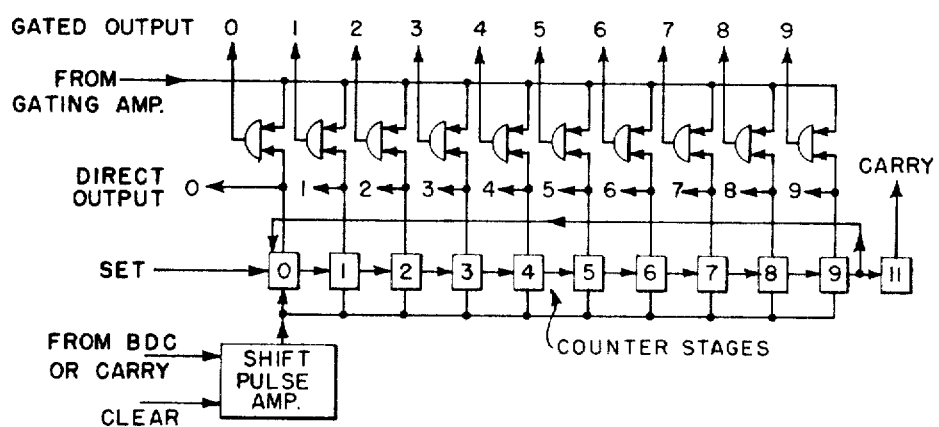
Figure 20:
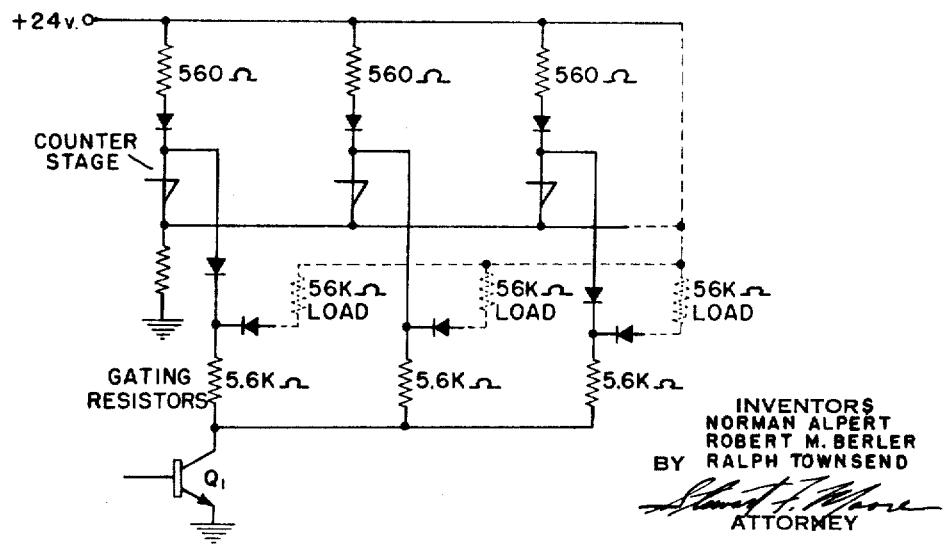
Figure 24:
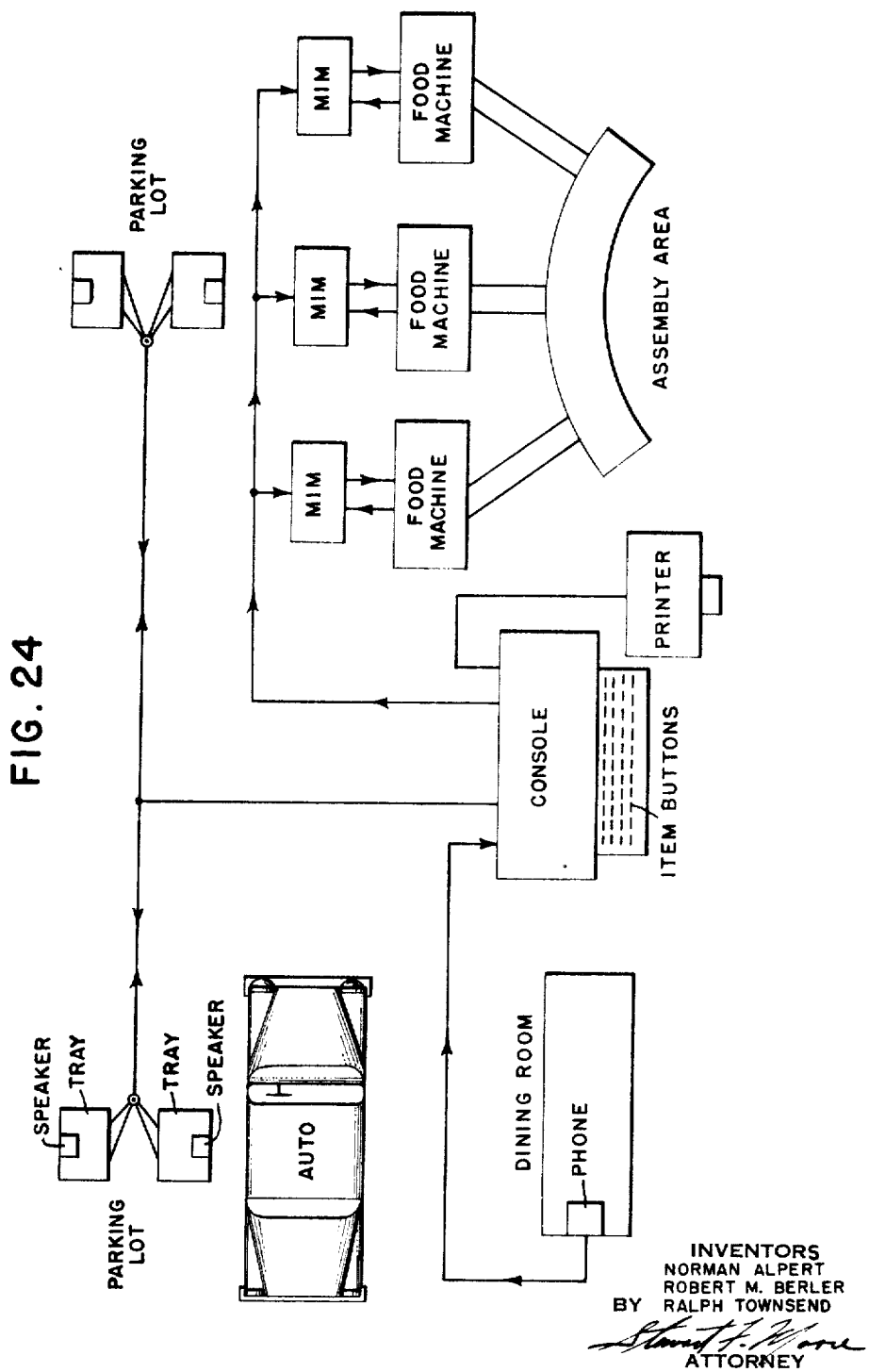
Figure 28:
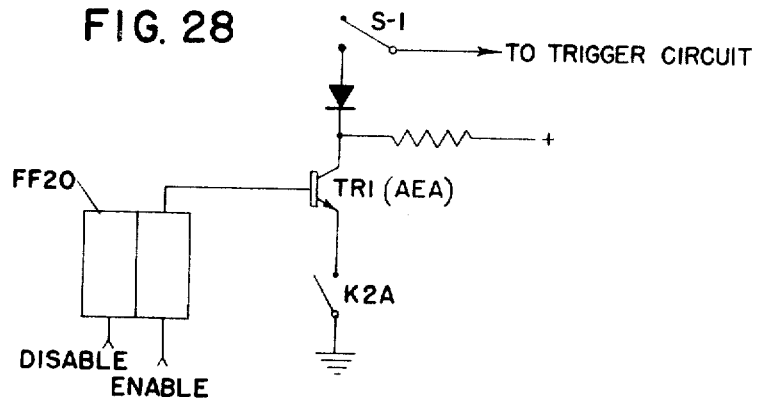
Figure 26:
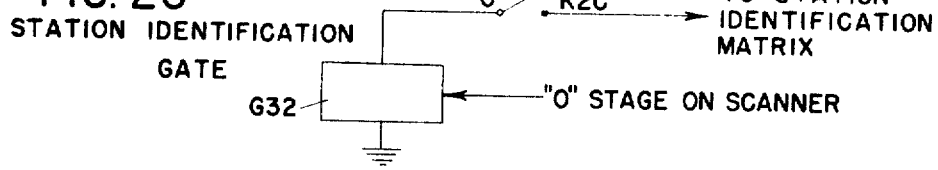
Figure 27:
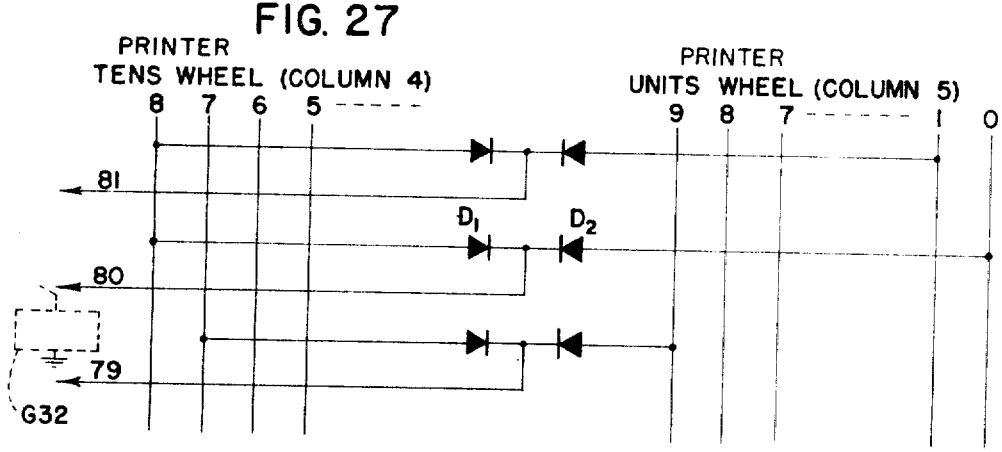

FIGS. 4A and 4B in combination are a block diagram of the functional sections of the equipment at the operator's position and the connections between these sections;

FIG. 5 is a block diagram of one of the like item quantity memories in the system of 4A in combination with the push button keys in the order selector, and associated control apparatus of the command logic section;

FIG. 6 is a block diagram of the item scanner in the ordering section of the system shown in 4A, and the associated control apparatus of the command logic section;

FIG. 7 are waveforms illustrating the item scanner step timing sequence under control of the associated apparatus of the command logic;

FIG. 8 is a circuit schematic of the complete diode matrix (decimal to binary encoder) forming the price bank of FIG. 4A;

FIGS. 9, 10 and 11 are circuit schematics of parts of the matrix of FIG. 4A used for description of the matrix operation with circuit elements of the item quantity memory and binary to decimal converter section;

FIGS. 12A and 12B in combination are a block diagram of the command logic section of the system of FIG. 4A;

FIG. 13 is a schematic circuit diagram of the gating amplifier of the command logic of FIG. 12A-B associated with the output of the item scanner of FIG. 6;

FIGS. 14 and 15 are schematic circuits of the basic Clear and SET circuits, respectively, of the system reset system in the command logic section of FIGS. 12A-B;

FIG. 16 shows waveforms illustrating the timing sequence of the apparatus in the command logic (Front End) section of FIGS. 12A-B to provide the desired functions in proper order;

FIG. 17 is a block diagram of the ring counter of the item quantity accumulator of FIGS. 4A-B, in combination with associated apparatus of the command logic section;

Figure 18:
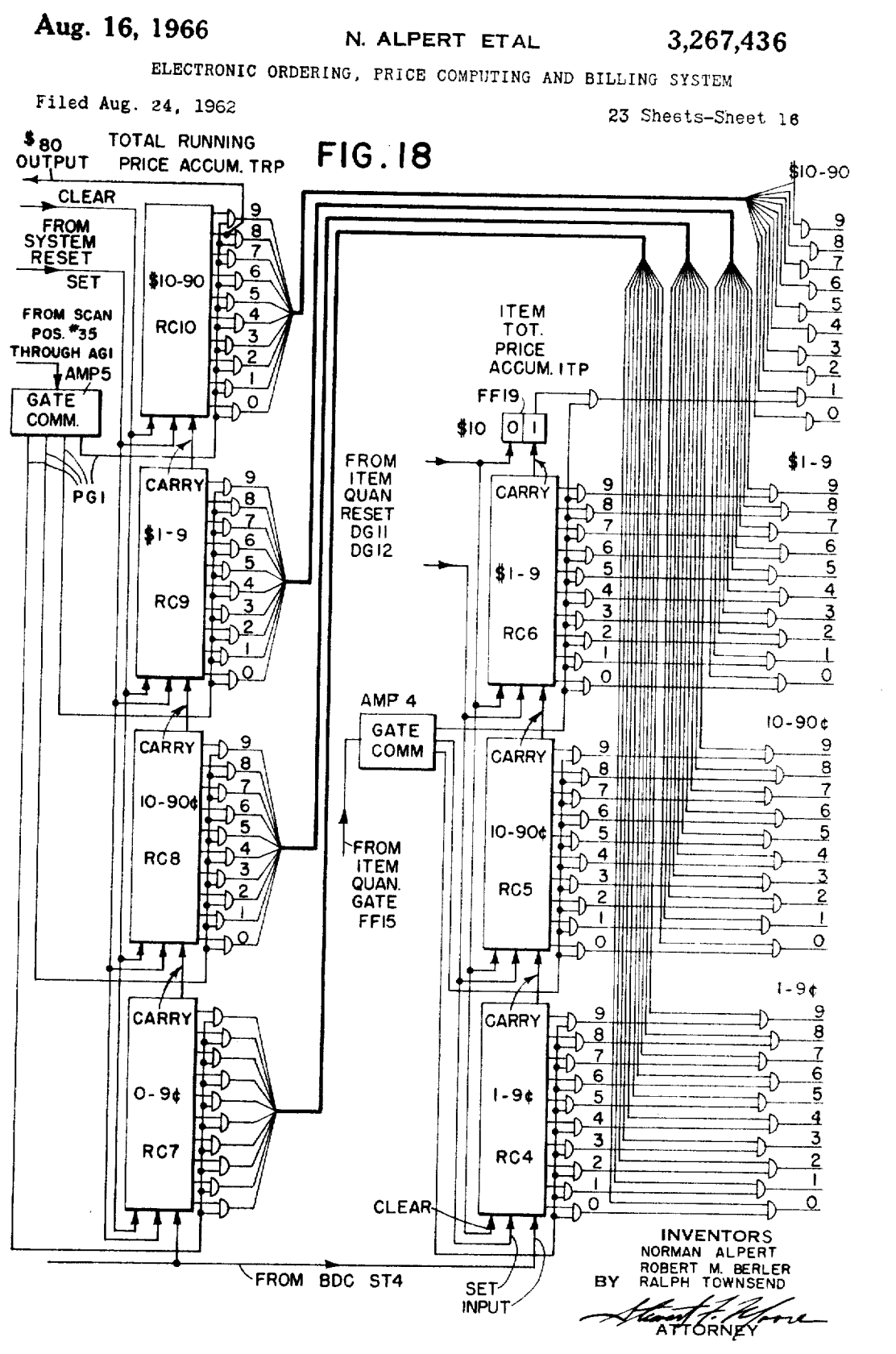

FIG. 18 is a schematic diagram of the price accumulator section of FIGS. 4A-B controlled by the output of the binary to decimal converter and the command logic apparatus of FIGS. 12A and B, and illustrates the flip-flop and gating arrangements for providing the outputs of the total running price and item total price accumulators to the associated printer;

FIG. 19 is a block diagram of the ring counters of the price accumulators;

FIG. 20 shows the schematic circuits of the ring counter and associated gates used for output gating of the price accumulator section of FIG. 18;

FIG. 21 is a block diagram of the $80 inhibit circuit of FIG. 18 and associated with the output of the item scanner in FIG. 6, under control of the apparatus in the command logic;

FIG. 22 is a block diagram of the totalizer or grand total accumulator of FIG. 4B;

FIG. 23 is a circuit diagram of means for manually changing the price of items applied to the price bank matrix of FIG. 8, utilizing a commercial pin type selector board;

FIG. 24 is a layout of the ordering, price computing and billing system of the invention applied to a typical automatic drive-in restaurant;

FIG. 25 is a block diagram of a complete system in accordance with the invention applied to an automatic drive-in restaurant as shown in FIG. 24, including the connections between the operator's console and each of the customer stations, the signaling and communication equipment;

FIGS. 26, 27 and 28, are circuit diagrams of means for respectively presenting station location to the computer, presenting station identification, take out and no charge information through a diode matrix to the printer, and an enable interlock between the communications and the computer;

FIG. 29 is a block diagram of a portion of a menu item memory, which is a bidirectional electromechanical counter;

FIG. 30 is a block diagram of a circuit controlled by the menu item memory for supplying back-order signal information to associated dispensing machines for control thereof, and an associated inventory counter, and timer for preorder anticipation;

FIG. 31 is a waveform showing the shape of the control (command) pulse applied to the paper advance input of the printer.

Two types of ring counters are used in this application, both have one solid state active element per stage to carry the information bit. The unidirectional type may be operated as a closed ring to recirculate the information, generating a carry each time the zero stage is passed, or may be open-ended. The bidirectional type is open-ended and is capable of driving a visual indicator. The counters may be cleared of information and the zero stage reset. These devices are not generally available in the market and are the subjects of Patent 3,189,894 granted June 15, 1965 to R. Townsend, and Patent 3,197,762 granted July 27, 1965 to W. J. Mahoney.

A sample pre-printed bill produced by the system is shown in FIG. 1 wherein various items are listed by name. Opposite thereto and in separate columns, the number of the items ordered and the total prices for each of the items ordered are printed. The total price for the order is printed at the bottom of the bill. Separate boxes are provided at the top of the bill for the customer's station number and a take-out notation, as well as the serial number of the bill preferably. The bill is of a four-inch paper tape cut from a fan-fold pack by the printer under command of the computer operator.

FIG. 2 shows the console or operator control desk housing all of the electronic equipment at the operator's position except the associated printer. This console includes a rectangular housing portion and a desk portion attached thereto. The rectangular housing portion is of adequate size for containing therein slidable racks on which are mounted all the electronic equipment shown in FIGS. 4A and 4B with the power supply therefor, one main and one auxiliary amplifier with an associated 1.5 volt supply, one ring-back oscillator and five control relays.

The keyboard, as shown in more detail in FIG. 3, on the console housing equipment of the electronic ordering, price computing and billing system of the invention at the operator's position has, as indicated, sixty item push buttons or order keys including thirty push-to-add and thirty push-to-subtract keys, one each for each of the thirty items on the menu; a menu order push button; a press-to-talk button for the operator to communicate with a customer over the associated intercom system; 81 customer station identification indicators which are control lamps engraved with the station number and light when the customer is calling; a plurality of auxiliary station identification indicators and phone jacks and an associated press-to-talk button for the operator to talk to the individual customers over the associated telephone system; an operator's phone jack and an auxiliary operator's phone jack for attaching an operator's and auxiliary operator's headset.

Also mounted on the keyboard are the operator's loudspeaker, reset, out-order, and announcement keys; a spare amplifier key, main and auxiliary volume controls for the main and auxiliary amplifier (mounted within the console), ring-back, service tone and auxiliary ring-back keys which will be further described later in the specification.

The all-electronic ordering, price computing and billing system in accordance with the invention is divided into five functional sections, namely:

(1) Ordering Section
(2) Price Bank Matrix
(3) Binary to Decimal Converter
(4) Command Logic
(5) Accumulator Section These sections are diagrammatically shown in FIGS. 4A and 4B. The theory of operation of the system will be described by analyzing the operation of each functional circuit, taken one at a time, in connection with the FIGS. 4A and 4B and/or the more detailed following drawings.

Many of these circuit operations occur simultaneously or in a certain definite sequence with the other circuit operations. The bill print-out operation will also be a sequenced operation.

Referring to FIGS. 4A and 4B, the ordering section comprises an order selector OS and an item scanner IS. The order selector OS comprises thirty item quantity memories IQM shown by separate boxes so labeled for each of the thirty food items 1 to 30, two push buttons labeled UP and DOWN associated with each of these memories, a take-out order circuit shown by the box so labeled and an associated take-out push button; an order menu or compute command push button; and a visible indicating device NI connected to the output of each of the item quantity memory circuits IQM 1 to 30. The item scanner IS, shown in the box so labeled, operates under the control of apparatus in the command logic CL, shown in the box so labeled. By placing a voltage on each of the output gates of the item quantity memories IQM in proper sequence, it is possible to sample any terminal which is activated in each of the thirty items. A separate group of five ring counters connected in series provides scanning voltages and will be further described. Only one item will have its voltage sampled at a time.

The sampled voltage is then provided to the electronic price bank matrix PBM or decimal to binary encoder, shown by the box so labeled, which is a diode matrix to present voltages in binary code representing any price possible for the computer. Thus, as each item memory device is scanned, the price bank matrix PBM will present a binary representation of each item total price being sampled. The output of the price bank matrix PBM is then provided to eight AND gates which are part of the binary to decimal converter circuit to be changed from static binary output voltages of the price bank into equivalent representation in decimal pulses.

The binary to decimal converter BDC is disclosed in the aforementioned patent to W. J. Mahoney, and will not be described herein except as is necessary for clarity of the description, as follows. The aforementioned patent to R. Townsend discloses alternative binary to decimal converters which may be used.

The output pulses from converter BDC are fed to the inputs of two chains of decade ring counters ITP and TRP. The first chain ITP accumulates the item total price and the second, TRP, the total running price.

The outputs of the item total price accumulator ITP and the total running price accumulator TRP under control of the command logic CL are applied to the associated printer as will be further described in connection with the description of the accumulators.

The item quantity of each order in the output of each of the item quantity memories IQM, 1 to 30, is delivered to the item quantity accumulator IQA under control of the command logic CL.

The ten outputs of the accumulator IQA are delivered through an OR gate OG1 to the printing wheels of the printer arranged to print the figures shown at the extreme left of the bill of FIGURE 1. The take-out order circuit operated by the associated take-out key is connected through the other input of the OR gate OG1 to the same printing wheel of the printer P.

The decimal pulse output of the binary to decimal converter BDC is connected to the grand total accumulator or totalizer GTA, represented by the box so labeled, to provide a visible indication of each day's, week's or year's business, available only to the manager of the business in which the system of the invention is used.

Stations 89 and 81 of the ordering section are connected to apparatus in the output of the binary to decimal converter BDC described in the aforementioned W. J. Mahoney application for disabling the price computing function while allowing the operation of the latter for its conversion purpose as described in that application. As indicated by the labeled lines labeled "Back-order" connected to the output of each of the item quantity memories 1 to 30, back-order signals are produced therefrom and transmitted to the back-order condition terminals for further use as will be described in connection with other drawings.

Other apparatus in the system of FIGS. 4A and 4B and the interconnections between the various functional sections thereof indicated by the labeled lines connecting these sections, will be described in connection with the description of FIGS. 12A and 12B and FIG. 18.

As shown in FIG. 5, the circuit of each of the like item quantity memories IQM has two order buttons as previously mentioned. Each time the ADD button is pressed, one of the desired items is ordered and is accumulative while each time the SUB button is pressed one ordered item is dropped from the entire order, of that item.

Various quantities (one to nine) of any of the thirty items may be ordered in the foregoing manner. The order information up to this time, has not been entered into the computer. Any changes in the items ordered or item quantity must be made at this stage of the ordering sequence. When the customer is satisfied that the order is correct and final, with no further changes to be made, the operator at the console presses the compute command or "Order Menu" button (FIG. 4A) which issues a compute command signal to the associated printer. Once this button is pressed, all item order and order subtract circuits are disabled and no further changes can be made.

For a take-out order, the operator will press a "Takeout Order" button (see FIG. 4A) to issue a command to the printer to so indicate by marking an X on the final bill and the food will, therefore, be properly wrapped. Otherwise, the food will be provided on a tray for eating on the premises.

As indicated in FIG. 5, a NIXIE tube or other commercial visual output indicating device NI and an associated zero extinction circuit ZEC, suitable for extinguishing the tube when no orders are in the item quantity memories, are slaved to each of the item quantity memories.

Each item quantity memory IQM, 1 to 30, includes a bidirectional ring counter BRC, preferably is of the type disclosed in the application of M. Felcheck, Ser. No. 197,662, filed May 25, 1962, which is electronically equivalent to a bidirectional stepping relay. As indicated in FIG. 5, ring counter BRC has ten positions and is activated by its own trigger circuit. A depression of the ADD order button will cause the trigger to step or count up in the ring counter one position. A depression of the SUB subtract order button will cause the trigger to step or count down in the ring counter one position. Only one of the ten output positions of the ring counter will have voltage present at any time. This voltage is used in two ways. First, it is used to energize the appropriate numeral in the visual readout. Secondly, the presence or absence of D.C. level at the zero stage, as other stages are energized, is used to open or close electronic gating circuits. If, for example, the Item 1 order button is depressed three times, the ring counter will have voltage present at its third output position, which voltage will remain for providing a memory. This output voltage indicates the number of units ordered of a particular item. In addition, through logical circuitry to be described, the price can be provided for any quantity of that particular item. One output of TG8P is connected to the price bank matrix PBM. This D.C. output is present when any other stages except zero is enabled, and turns off when counter BRC rests on zero.

The functions of the other trigger circuits, OR and AND gates, transistor emitter followers and other equipment of the item quantity memory connecting the ring counter BRC to the item scanner IS and to the price bank matrix PBM and the advance counter gates as shown in FIG. 5 will be described later in connection with operation of the command logic CL or the complete description of the system operation.

By placing control voltage on each set of the thirty item output gates in sequence (scanning), it is possible to determine which of the items are carrying information. The item scanner IS comprising a separate group of five ring counters provides the scanning voltages and will be described in connection with FIG. 6 and the command logic apparatus CL in connection with FIGS. 12A and 12B. The voltage of an item sampled by item scanner IS will then pass into an electronic price bank if any orders have been placed in the item.

PRICE BANK

(See FIGS. 8 to 11)

The price bank or decimal to binary diode matrix PBM is provided to invert decimal information received from the item quantity memories into binary form.

A D.C. input voltage less than a specified level will, by means of the matrix diode arrangements, be impressed upon selected groups of output amplifiers L1 to L8, each of which represents a digit in the binary code, and therefore, binary patterns are set up which are acted upon by the following binary to decimal converter BDC. The matrix PBM is therefore, an encoding system.

The matrix consists of a network of semi-conductor diodes arranged in combinations of logical OR gates which are negative-going or biased, as shown in FIG. 9. Thus, if no diodes are negative biased for transmission, then the output voltage $E_o$ is determined by the ratio $R_1/R_2$. If any diode is biased for transmission, then the point $E_o$ assumes the minus potential (less the voltage drop of the diode).

A portion of the gate system in the computer embodying the foregoing is shown in FIG. 10. The gate input level $E_1$ is supplied from the transistor emitter-follower fed from AND gate AG6 in each of the item quantity memories IQM through follower AMP10. In this example, a price of 5¢ has been assigned to the item represented by the binary code $$\frac{L3 L2 L1}{1 \ 0 \ 1}$$

therefore the L1 and L3 transistor amplifiers are connected via diodes $D_1$ and $D_2$, respectively, to the emitter-follower of the transistor $T_1$. Diodes $D_3$, $D_4$, $D_5$ and $D_6$ are connected to other gating buses which are positive at this time, therefore these diodes are back-biased and decoupeld.

When the input signal to the follower drops to ground, point $E_1$ also becomes grounded. Points $E_{o1}$ and $E_{o2}$ then, by virtue of $D_1$ and $D_2$, will be clamped to ground and current will flow from +24v. through $R_1$, transistor $T_2$ emitter base, and $R_3$ to ground. Transistor $T_2$ will conduct and a voltage drop appears across $R_1$. Zener diode ZD will no longer have sufficient voltage across it to cause zener current to flow and emitter $T_3$ will be cut off. The voltage on the output line will rise to +24v.

Diode $D_7$ is used at the output of the follower to allow decoupling of the matrix input bus in the circumstance where the price of 5¢ is assigned to more than one item. Ground potential may then be applied to the bus by any follower AMP10 in the Item Quantity Memory IQM bank without affecting the other followers tied into the same bus as all diodes $D_7$ are back-biased except the one circuit in use.

The multiplicity of diodes used in the encoding system are more conveniently displayed in a matrix form, a portion of which in such conformation is shown in FIG. 11 with the associated control apparatus.

In the full Price Bank Matrix PBM, as shown in FIG. 8, there are 148 diodes, permitting 40 price breaks in 5¢ increments from 5¢ to $2.00. Eighty binary output lines, L1 to L8 are provided to encode decimal values into an eight bit binary code. The diodes preferably are silicon diodes. No speed requirements are necessary as the gating levels are D.C. Silicon is required to reduce reverse leakage currents at the highest operating temperature.

The emitter-follower configuration is used to feed the matrix input lines to permit the maximum loading of six output amplifiers ($1.90) during the "off" interval (gating period) from raising $E_1$ to greater than +9 volts.

The item price is entered into the price bank matrix PBM and encoded in the following way:

If an item price is 15¢ and three of such items were ordered, as the ring counter BRC steps itself back to zero after the ADD key associated with the particular item quantity memory IQM for that item has been operated three times by the operator, the 15¢ bus in the price bank matrix PBM would effectively be entered three times in binary form. After binary to decimal conversion in the following converter BDC, a total of 45¢ in pulses would be provided to the price accumulators ITP and TRP.

FUNCTIONAL DESCRIPTION OF ORDERING AND COMMAND LOGIC

(FIGS. 12A and 12B, FIGS. 14 and 15)

*System reset.*—The operation of system reset DG9 and DG10 places the entire computer into a predetermined state and is necessary so, that given the proper inputs, the machine will perform its prescribed functions.

There are three ways in which the computer can be put into the system reset mode, namely:

(1) System turn on,
(2) Manual push button, and
(3) At the completion of its normal operating cycle.

When the system is turned on it will automatically go into the system reset mode by the action of a monostable multivibrator time delay circuit DG2 (FIG. 12A) which supplies a pulse to the "System Reset" DG9 and DG10 circuit via OR gate OG3 one second after the machine turns on. The "Manual" operation of initiating system reset is through trigger TG10 which supplies a pulse to the system reset DG9 and DG10 circuit via OR gate OG3 each time the system reset button is actuated. At the completion of the computer's normal operating cycle a pulse is delivered from position 45 of item scanner IS via trigger TG19 and OR gate OG3 to the system reset DG9 and DG10 circuit.

The Reset circuits for the computer consist of a pair of monostable multivibrators, arranged in cascade. The first circuit presents a "clear" signal for one millisecond, the second provides a 250μ sec. "set" signal.

The combination of time delay, monostable multivibrators, DG9-DG10, and trigger TG8 make up the system reset circuit. Delay generators DG11–DG12 and trigger TG20 make up the item accumulator reset circuit. Both circuits produce identical outputs and differ only in the functions they perform.

*Clear circuit (DG11, DG9) (FIG. 14).*—Due to the multiplicity of loads connected to the clear circuit (both ring counters and flip-flop reset) the multivibrator output is used to drive three parallel transistor switches. The outputs of these switches, in turn, drive the various load circuits. The basic circuit is shown in FIG. 14.

A transistor $Q_2'$ is normally conducting and point A is at +3.0 volts. A stabistor diode chain $D_S$ is connected to and fixes the emitters of transistor $Q_3'$, $Q_4'$, $Q_5'$ at +4.0 volts, the bases of which are connected to point A, therefore, transistors $Q_3'$, $Q_4'$ and $Q_5'$ are reversed-biased by −1 volt. The output transistors $Q_3'$, $Q_4'$, $Q_5'$, are non-conducting and the levels on the output lines are +24 volts. The clearing interval is initiated by either a positive or negative trigger pulse to the base of the appropriate transistor. A positive pulse to $Q_1'$ base will start to turn transistor $Q_1'$ on, and the regenerative action of the multivibrator will continue the turn-on action, turning off transistor $Q_2'$. A negative pulse to $Q_2'$ base will start the turn-off of transistor $Q_2'$ and the regeneration will complete the action. In either case, the net result is for transistor $Q_2'$ to become nonconducting, and to maintain this condition for a time determined by $0.7C_TR_T$. At the end of this interval transistor $Q_2'$ will snap back into conduction, terminating the clear action of the circuit.

When transistor $Q_2'$ is nonconducting, point A rises to a level dictated by $$\frac{(E_s - E_{ds})R_1}{R_T}$$

where $E_{ds}$ is the voltage across the diode chain $D_S$ and $R_T$ is the parallel combination of $R_2+R_3+R_4$ together with their associated resistances of the base-emitter junctions of $Q_3'$, $Q_4'$, $Q_5'$. As this level is designed to be more positive than $E_{ds}$ the output transistors $Q_3'$, $Q_4'$, $Q_5'$ will be forward biased and conducting in their saturated mode. A potential of +5.0 volts will appear on the output lines.

It should be understood that the diode chain $D_S$ could be supplanted by a zener diode of the proper voltage.

*Set circuit (DG12, DG10) (FIG. 15).*—The purpose of the set circuit is to provide a positive-going pulse to the 0 stage of all the unidirectional ring counters in the accumulators after an interval to allow the clear operation transients to decay. The circuit, as shown in FIG. 15, is also a monostable multivibrator, but only the trailing edge of the pulse is used.

During the quiescent time of the circuit, transistor $Q_2''$ is conducting, transistors $Q_1''$ and $Q_3''$ are nonconducting. At the end of the clear interval, when transistor $Q_2$ of circuit DG9 snaps back to its conducting stage, a negative-going pulse is applied to the base of $Q_2''$ of transistor circuit DG10. This monostable multivibrator changes to its unstable, or timing, condition, with transistors $Q_2''$ turned off and $Q_1''$ conducting. The positive-going pulse applied through capacitor $C_1$ to the base of $Q_3''$ does not affect transistor $Q_3''$ as it is in the direction to drive it further off.

At the end of the timing interval (250 µ sec.), transistor $Q_1''$ turns off and transistor $Q_2''$ snaps back on. The negative-going step presented by this turn-on action is differentiated and applied to the input of transistor $Q_3''$ which now is caused to conduct to saturation and the collector rises to near +24 volts. This positive step is applied to the anodes of the Shockley four-layer diodes in all the ZERO stages of the unidirectional counters, through the coupling capacitors (not shown). These four-layer diodes are thereby caused to break down and conduct. Therefore, conduction is effected in the ZERO stage of all the ring counters in the price accumulators and item quantity accumulator.

When the condenser $C_1$ becomes charged, the base drive to transistor $Q_3''$ decays and the transistor $Q_3''$ gradually turns off. It is maintained in its off condition by the bias provided through stabistor diode $D_1$.

Once triggered, the system reset circuit DG9–DG10 will provide three signals, namely:

(1) Clear,
(2) System Clear, and
(3) Set.

The "Clear" signal is used to clear accumulators. "System Clear" and "Set" signals are used to trigger flip-flops, time delays, one-shots, etc. The "Set" signal is further used to set the initial state of the accumulators.

The actual sequence of operations called for by system reset is as follows:

(1) The "System Reset" circuit DG9 and DG10, through its "Clear-Set" signals, resets both the total running price accumulator TRP and the scanner IS to ZERO. The "Set" signal further triggers a flip-flop FF20, the resulting state of which acts to provide power to the front panel switches through the address enable amplifier AEA and to lock out feed back signals from printer P by disabling a status signal gate AG23. The "System Clear" signal triggers pulse generator PG28 (FIG. 5), the NIXIE clear circuit, and also initiates the item accumulator reset circuit (DG11, DG12, TG20) operation through OR gate OG5. The scanner IS is also cleared and set to 0 by the system reset circuit. The sequence of operations is further discussed later relative to scanner operation.

(2) After being initiated by the system reset circuit DG9–DG10, the item accumulator reset circuit DG11 and DG12 provides three output signals, namely;

(a) Item Accumulator Clear,
(b) Item Clear, and
(c) Item Set.

The item quantity (IQA) and item total price (ITP) accumulators are reset to 0 by the item "Clear" and "Set" signals. The "Item Accumulator Clear" signal triggers flip-flops FF11 (FIG. 12A), FF14, FF15 and FF16 (FIG. 12B), and trigger TG2 (FIG. 6). The resulting state of FF11 closes AND gate AG13 and opens AND gate AG10. The triggering of TG2 starts a complex scanner cycle which is discussed later in connection with "Scanner Description and Operation." The "Take-Out Order" FF14 is set to provide a zero signal at its output which calls for no printing information at wheel No. 1. Flip-Flop FF15 is set to act on enable gate EG4 to disable the AND gates (FIG. 17) at the outputs of the item ring counter RC1 of item quantity accumulator IQA, and the item total price accumulators ITP (FIG. 18). Flip-flop FF16, the print enable device, is set to a state whereby its output control signal does not call for print enable.

The item accumlator reset circuit goes through this sequence of operations each time system reset is called for or a return signal from the printer is passed through status gate AG23 (FIG. 12B).

Since the scanner IS has been set to its 0 or rest position by the system reset operation, all outputs except the 0 stage are at their off potentials. Schmitt trigger inverter TG32, which is driven by the 0 stage acts to enable the station identification matrix. The total running price accumulator TRP has its output AND gates disabled through the action of the scanner levels on AMP5 of the scanner. All items are disabled by outputs through position 31 of the scanner. Further, all scanner outputs to the spacing bus SB (FIGS. 4A and 6) are disabled by the scanner off levels at positions 1, 32, 33, 34, 36 through 44. The computer has now been set to a predetermined state whereby it is ready for new information and will correctly act upon it when the "Compute Command" is given by the operator.

*Item scanner-description and operation (FIG. 6 and FIGS. 12A, B).*—The item scanner IS controls the sequence of activities once the compute command is given. As the scanner is stepped to position after position, different computer functions are performed. In this sense, the computer is preprogrammed by the scanner connections.

Physically, the scanner IS is made up of five standard, open ended, ten-stage ring counters RC18, 19, 20, 21, 22 (not shown) connected in series. Since each ring counter has its own signal transfer mechanism, these are all connected in parallel, so that for each transfer signal all the ring counters act to step the signal ahead provided there is a signal in that ring counter. The clear circuits are also connected in parallel so that all ring counters are cleared simultaneously. The set circuit of the first ring counter RC18 is connected, all others are open, so that after the rings are simultaneously cleared the first stage of the first ring counter is set. Now, when a shift pulse is applied, this signal will travel along until it gets to the tenth stage at which point it transfers to the next ring counter RC19. The mechanism of transfer is to connect the output of the last stage of the first ring counter RC18 to the first stage of the second ring counter RC19. The ring counters are left open-ended, so that once the signal has reached the last stage of a ring counter it will carry to the next, leaving the first ring without a signal. In this manner the signal is pulsed along and transferred from ring to ring.

The stepping of the scanner is accomplished by the triggering of TG2 by the item accumulator clear signal. TG2 triggers both DG30 (400μ sec. delay) and DG31 (200μ sec. delay). DG30 and DG31 go into the quasi-stable state. DG30 acts on enable gate AMP9 such that the ring counter gate loading is removed for the period that DG30 is in its quasi-stable state. DG31 acts for a total time of 200μ sec. at the end of which it triggers the Shockley one-shot trigger TG5. TG5 supplies a shift pulse to all the scanner ring counter stepping inputs in parallel. The time to step the scanner is 15 to 20μ sec. The scanner has now moved to its new position without any gate loading. The gates will be reapplied after DG30 completes its quasi-stable period (time delay). In this manner the scanner is stepped without gate loading. The scanner step timing sequence is shown by the curves of FIG. 7.

*Command gating amplifier (AMP4, AMP5) (see FIG. 13).*—The function of the command gating amplifier (AMP4, AMP5) is to act as a closed switch, completing the ring counter gating current path to ground when the scanner IS is on position 35 in the case of the total running price accumulator TRP, and when the flip-flop FF15 is enabled in the case of the item total price accumulator ITP. For both circuits, the enable signal is approximately +3.5 volts and the inhibit signal is +22 volts.

A two stage complementary amplifier, as shown in FIG. 13, is used for the command gating amplifier, the output stage consisting of four NPN transistors $Q_2$, $Q_3$, $Q_4$ and $Q_5$ driven in parallel from a single first stage PNP transistor $Q_1$. Each second stage transistor ($Q_2$ to $Q_5$) is used to drive a single ring counter gating bus, consisting of ten 5,600 ohm transistors in parallel. For the inhibit signal both $Q_1$ and $Q_2$ to $Q_5$ are nonconducting. The ZERO signal level presented to the input of the amplifier is approximately 4 volts below the conduction threshhold of the 6.8 volt zener diode ZD1; therefore no base drive current flows to $Q_1$. The stabistor diode $D_s$ establishes a reverse bias voltage on the emitter-base junction.

The printer P is caused to advance a line without printing, whenever the output of Schmitt trigger TG40 (FIG. 12A) is at low potential. Trigger TG40 is controlled via OR gate OG1 either by the outputs of the AG10 gates or the spacing-bus SB which is the common output of the AND gate outputs of those scanner stages (FIG. 6) which are programmed to give a line advance.

The printer P is caused to print information present on its print wheel lines whenever flip-flop FF16 (FIG. 12B) sends a negative D.C. level via the print enable line. FF16 is reset by the "System Clear" signal and caused to give a print enable signal by a 100 μ sec. delay generator DG5 which can be triggered through OR gate OG4 (FIG. 12A) by either trigger TG9, delay generator DG3 or the transistor amplifier trigger TG4. Trigger TG9 is a Shockley one-shot switch. DG3 is a delay generator (100 μ sec.) which is caused to trigger by Schmitt trigger TG41, the trigger, in turn, controlled by the OR gate OG2 through AND gate AG13. TG4 (FIG. 6) is attached to those positions on the scanner IS and is triggered where a print command is desired.

The timing sequence of the command (front end) logic CL is given by the waveforms of FIG. 16 (for a quantity of three).

ITEM QUANTITY ACCUMULATOR CIRCUIT

*(FIG. 17)*

The function of the item quantity accumulator IQA circuit is to present to the printer P the quantity of each item ordered in synchronism with the total price therefor furnised by item total price accumulators ITP.

For example, if 4 of a 25¢ item are ordered, the item quantity accumulator IQA activates line 4 of column 1 of the printer P and the total price accumulators ITP activate lines 0, 1, 0, 0 in columns 2, 3, 4 and 5 respectively.

In the standby condition (computer waiting for information), ring counter RC1 of IQA has been cleared and set to ZERO by the system reset signal (B) acting through the item accumulator reset circuit. When the compute command is given flip-flop FF20 (FIG. 12A) (D), which was previously in a state to disable AND gate AG23 and consequently lock out any return signals from the printer P via TG39–TG6, conditions gate AG23 to be enabled by a status signal from the printer.

When the first ordered item is being acted upon, a pulse will appear at (A) each time the binary to decimal converter BDC is initiated. Ring counter RC1 counts the total pulses appearing at (A) and stores this information. (Each time the BDC converts the item total price accumulators store the total count or price). At the end of the computation for the first item a pulse will appear at (C) from generator DG3 which calls for a print command. Flip-flop FF15 is now set to a state whereby AMP4 of gate EG4 enables the output of RC1. The outputs of the item total price accumulators ITP are simultaneously enabled. The printer P will print the item quantity and item total price information. At the completion of the printing cycle, a change in the status signal occurs and is sent through TG6–DG39–AG23–TG1 which activates the item accumulator reset circuit (DG11–DG12) which resets FF15 which acts on AMP4 to disable the output gates to the printer. The reset circuit also clears and sets RC1 for the next computed item.

PRICE BANK ACCUMULATORS

*(FIGS. 18, 19 and 20)*

The price bank accumulators are the elements used to store the decimal bits generated by the Binary to Decimal Converter BDC and present them to the printer upon command from the command logic CL. As the disclosed system will not be required to provide tax information with this model, only two price accumulator banks are included, one for item total price ITP and one for the total running price TRP.

Each accumulator consists of a number of recirculating ring counters (RC) connected in such a manner that the tenth (final) stage generates a carry signal which moves the following counter by one step. For example, every time the cents unit counts through the tenth stage, the 10¢ counter is advanced one step. Likewise, the 10¢ counter advances the $1.00 counter at its tenth stage. The cents unit acts upon every pulse, or bit, from the converter BDC, the 10's unit runs at $1/10$ the speed and the 100's, or dollar unit, is driven at $1/100$ the bit rate.

The two accumulators, total running price (TRP) and item total price (ITP), are driven in parallel from the binary to decimal converter BDC. At the end of any group of addition steps, which perform the price times item-quantity multiplication function in the converter for each item, the item total price accumulator ITP is commanded to read out its stored information to the printer P. After the printer P acts upon the information and returns its STATUS (print complete) signal to the computer, this accumulator is cleared and reset to its ZERO stage, ready for the computation of the next item.

The total running price accumulator TRP is neither read nor cleared at this time, but continues to accept the decimal bits from the converter multiplication action on every item. In the appropriate space at the end of the preprinted bill form, the total running price accumulator TRP is gated to read out its information, then is wiped clear and all its stages are reset to zero.

The gating signal for the total running price accumulator TRP is taken from the thirty-fifth stage of the item scanner IS, and the clear-set action is initiated by the forty-fifth stage. Item total price gating is controlled by command logic CL and the clear-set is triggered by the printer STATUS signal.

As shown in FIG. 18 four counters RC7 to RC10 are used for total running price—providing a $99.99 maximum price, but only three counters RC4 to RC6 for the item total price, having $9.99 maximum. The maximum price handled by the price bank matrix PBM (FIG. 8) is $2.00 and maximum quantitiy is 9. In order to accommodate item total price between $10.00 and $18.00 without the necessity of the camplete $10.00 ring counter, which would be unused except for one stage, a flip-flop FF19 is added to generate this digit. The circuit is gated and cleared simultaneously with the item total price accumulator.

The unidirectional ring counter used in the price accumulators, diagrammatically shown in FIG. 19 and disclosed in the copending patent application of W. J. Mahoney and N. Murthy, Ser. No. 184,766, filed April 3, 1962 and now Patent No. 3,235,748 is of the type having a single active element (four-layer diode) for each digit and has ten stages for carrying the count and the decimal output which may be read directly without decoding. As shown, an auxiliary eleventh stage is provided to generate a shaped carry signal when energized simultaneously with the 0 stage as the ninth stage transfers its count, but is not energized when the 0 stage is initially set before computation.

Both direct output and gated output are available from the counter. At a direct output the counter can be a current sink for up to 10 ma. The gated output does not provide current into the counter and the gating impedance is 56,000 ohms. The gate configuration is the negative-going AND, with an output current of 1 ma.

The output gating method must avoid introducing voltage losses across the counter stages during dynamic operation of the rings. Such reduction of voltage across the Shockley diodes would adversely affect the counter's voltage tolerance capability. Consequently, the gating system of FIG. 20 is provided but any suitable corresponding circuit may be used.

One transistor is used in the switched mode, to complete the ground return paths of all of the 5600 ohm gating resistors to ground. During dynamic operation, this transistor is nonconducting, so no current flow will be drawn through the nonbit carrying 560 ohm anode resistors, which current would thereby reduce the voltage available to the four-layer diodes. When the ring stops, the gating transistor Q is commanded to conduct, thus providing a current path for all gating resistors. For the bit carrying stage, the four-layer diode anode will be near ground, the gated output voltage level will fall to the division $24 \cdot 5600/56,000 = 2.4$ v. and current flow through the 56,000 ohm load will be 0.4 ma. Output voltage at the nonbit carrying gates will be $24 - (24 \cdot 560/5600) = +21.7$, or 2.24 volts across the 56,000 ohm load resistor for a current flow of 0.04 ma. This 10:1 on/off ration should provide adequate margin for one and zero signal levels.

EIGHTY DOLLAR INHIBIT CIRCUIT (FIG. 21)

An inhibit circuit, as shown in FIG. 21, exists for the purpose of disabling the printer from printing a total price when the bill exceeds a predetermined high value such as $80. This is desirable as a warning that a large amount of money is involved and, as a double check upon the computer, a manual addition should be made of the bill.

When the total price accumulator TPA reaches the $80 step, its direct, ungated output, amplified by AMP3, disables flp-flop FF21 and, in turn, AND gate AG1 so that when the scanner IS steps to position 35 ("Total"), the total gating amplifier AMP5 is not allowed to turn on. The enable bus for the total running price accumulator TRP is therefore not energized and the printer P receives no information.

At the end of the computing cycle, flip-flop FF21 is enabled by the system clear signal, and remains in this state until a new total of $80 appears. Gate AG1 is therefore normally in condition to be enabled by position 35 (through emitter-follower E.F.) for all computation cycles totalling less than $80.

TOTALIZER (FIG. 22)

The totalizer GTA used in the ordering, price computing and billing system of the invention, untilizes a combination of magnetic and mechanical counters to carry the grand total prices of the computer. All digits up to $999,999.99 are to be shown, the dollars on the mechanical counter face and the cents on a light bulb display. The readout is under lock and key, for limited availability and is non-resettable except by a major disassembly.

Because of the 4000 cycle counting rate of the computer, the first two totalizer decades should not be mechanical which run reliably in the 40 to 60 impulse-per-second range. Electronic decades are desirable and are capable of maintaining pennies and dimes totals during shutdown by use of magnetic elements. The pennies decade is driven from the computer's binary to decimal converter BDC at the 4000 i.p.s. rate; the carry pulse from the tenth stage of this decade triggers the dimes decade at a 400 i.p.s. rate and the carry from the dimes decade triggers the mechanical counter at a 40 i.p.s. rate.

A new counter element called the MAD (multiaperture device) register may be used as the high speed magnetic ring counter elements $MRC_1$ and $MRC_2$ of totalize GTA shown in FIG. 22, and is disclosed in U S. Patent No. 2,995,731, issued August 8, 1961 to J. P. Sweeney. These registers consist only of ferrite cores and wire, the mechanism for transferring the information bit being by flux path control. The output of each core is used to light a miniature lamp directly and the whole device is a completely passive element except that pulse generating circuits using semi-conductor devices are used to energize the bit transfer.

The decimal output of the binary to decimal converter BDC (Schmitt trigger ST4) drives a binary pulse former $BPF_1$, as disclosed in U.S. Patent 3,191,060 granted June 22, 1965 to W. J. Mahoney, which provides pulses of 2 amperes of $\mu$ sec duration alternately on the advance even, advance odd lines of the magnetic ring counter $MRC_1$. On receipt of each pulse, a counter EMC is caused to advance one stage.

As the count passes from the ninth to the 0 stage, a carry signal is generated which triggers a second binary pulse former $BPF_2$ to drive the second or 10¢ magnetic ring counter $MRC_2$ in a similar fashion. Upon transfer of the bit from 90¢ back to 10¢, a carry signal is generated which triggers a driving amplifier DR for the electromechanical counter EMC which is thereby caused to advance its least significant digit ($1.00).

The visual indicator VI display lamps for the two decades of magnetic counters are energized by 300 kc. oscillator PO2 as gated by the magnetic ring counter elements $MRC_1$ and $MRC_2$ and energized by the momentary push button PB so that the lamps are not continually burning but are lit only when readout is desired.

A turn on time delay TOD is used to disable the binary pulse former $BPF_1$ for a sufficient interval at system turn on to allow the active elements of the binary to decimal converter BDC (flip-flops, binaries, Schmitts) to be set to their stable conditions by the automatic system reset DG2 of FIGURE 12A. By this means spurious bits are kept from being introduced into the totalizer.

The P used with the system of the invention may be of any suitable type such as a Shepard "Typer" manufactured by Shepard Laboratories, Inc. of Summit, N.J. and protected by U.S. patents to F. H. Shepard, Jr., No. 2,987,210, issued April 2, 1957 and No. 2,997,232 issued August 22, 1961. It should, however, combine electronic and electromechanical principles for printing from information signals furnished by a data processing system, have a suitable speed and a cycle of operation, and provide feed-back signals as required.

SYSTEM OPERATION

*(Refer to the system block diagram of FIGS. 4A–B and the ordering and command diagram, FIGS. 12A and 12B)*

The system operation for one billing operation is as follows:

(1) An operator inserts quantity information individually into the item quantity memory bank IQM (Items #1 to #30), the accumulators of which are reversible for corrections. As the count progresses, each item total quantity is displayed visibly on a NIXIE indicator NI. In case the order is to replace at no charge, the operator pushes the station 81 selector button which permits printing of a new bill with item quantity identification without prices. A similar operation is performed for an Employee's Free Lunch; here selector button 80 is actuated.

(2) When order insertion is completed, the operator then activates the compute command button.

(3) Compute Command: (A) Conditions the STATUS gate AG23 via FF20 to provide STATUS signals from the printer P through Schmitt trigger TG6 and the 100 μs delay generator DG39 to be operative upon the item scanner IS which has been locked against printer signals occurring after the end of a previous cycle, when the system was reset. When flip-flop FF20 is enabled, the address enable amplifier AEA is disabled, removing power from all operator's push buttons preventing the entering of further information into the machine while computation is taking place. A further switching arrangement is in series with the address enable amplifier AEA and the system supply. There are one set of contacts on all customer communication and identification relays, connected in parallel, and at least one of these relays must be closed to signify operator-customer contact before any of the operator's push buttons and the compute command can be activated. External circuitry disables the relay after the identification has been printed. (B) A first PRINT COMMAND is given to the printer P (DG5–FF16) which prints the symbol X by the column 1 wheel in the first space on the bill if the take-out button has been pushed or phone station 79 used. (This signifies a take-out order.) The station identification information is printed in columns 3, 4 and 5 of the bill.

(4) After the printing of the take-out order symbol (X) and the station identification information, the printer returns a STATUS signal into the status signal gate AG23 through TG6 and DG39, initiating item quantity reset (DG11–DG12). Every STATUS signal from the printer P initiates a subsequent computer event through this item quantity reset circuit. The following events take place simultaneously for each return STATUS signal:

(1) The scanner IS is stepped one position,
(2) The item quantity accumulator IQA (ring counter 1) is reset to 0;
(3) The item total price accumulator bank ITP is reset to 0;
(4) The following flip-flops are reset;
   (a) FF11—the line advance gate (AG10) is enabled.
   (b) FF16—the print enable device is reset removing the D.C. control (print enable) signal until another is called for.
   (c) FF15—through enable gate AMP4 disables the output gates of the item quantity and item total price accumulators ITP.
   (d) FF14—the take-out order device is reset removing the D.C. control signl at its output.

(5) The scanner IS has now been moved from the zero position to Step 1, and the station identification information has been removed by Schmitt trigger inverter (disable) TG32 whose output is in series with the station identification information. The input of TG32 is taken from the zero scanner stage so that the output is at ground when the zero stage is on and is open for all other positions of the scanner IS. The scanner IS one position is tied to the spacing bus SB, to permit one unprinted space on the bill. The spacing bus SB is clamped, or gated, by DG30 and the enable gate AMP9, therefore 200 μ sec. (the difference between the delays of DG31 and DG30) after the scanner moves to Step 1, the spacing bus SB is activated. Schmitt trigger (restorer) TG40 is energized through the OR gate OG1 and a LINE ADVANCE signal is given to the printer P, moving the bill one space.

(6) A STATUS signal is returned from the printer P after the bill has been moved, and the scanner IS is stepped to stage 2 which is the Item Number 1 position. (Although the usual clear signals were sent to FF11, item quantity accumulator IQA and item total price accumulator ITP, these had not been activated when the paper spacing alone was commanded, therefore no action results in these circuits.)

The description of the computer action on scanner position 2 (Item No. 1) is typical of all positions from 2 to 31 (Items No. 1 to 30). Each stage is connected (without internal gating) to its appropriate item AND gate AG5 (FIG. 5) through an emitter-follower AMP8, to reduce the loading of the scanner stage. A second output is taken from the followers AMP8 and AMP2 to the MIM conditioning circuit, preparing for insertion of the item into the ordering system (application of M. Felcheck, Ser. No. 181,337, filed March 21, 1962). The computer action may take either of two forms at this point, depending upon whether (A) no quantities have been entered in the item quantity memory IQM, in which case the printer P only moves the bill one line without printing, or (B) quantities are in the memory, computation must take place and the bill will receive printable information before shifting.

*Condition A.*—With no item in the item quantity memory for the given scanner stage.

(7A) Item quantity memory Schmitt trigger (D.C. restorer) TG8 will send a normal signal to the AG5 gate, the 0 NIXIE indicator stage NI being in conduction. The other AG5 gate input, being from follower AMP8 of the appropriate scanner stage, will also be enabled and a signal will pass through the LINE ADVANCE gating system to Schmitt trigger (restorer) TG40, then to the printer P, moving the bill one space without printing.

(8A) The STATUS signal is returned from the printer P, stepping the scanner IS to the next stage.

*Condition B (See FIGS. 4A and 4B).*—Quantities are in the item quantity memory IQM. Computation, back-ordering and bill printing must take place. The computation will be handled by causing the binary to decimal converter (decoder) BDC to emit the number of decimal bits corresponding to the price for each step of the item quantity memory IQM as it counts itself progressively downward to zero items. In other words, if there is a quantity of five held in the item quantity memory and the individual price of the item is twenty-five cents, then the BDC (decoder) will emit five bursts of twenty-five pulses which will be entered into both the item total price ITP and total running price TRP accumulators. Between each burst of pulses the ring counter (RC) of the item quantity memory IQM will be stepped backwards one step, the ring counter of the item quantity accumulator IQA (which provides printing information for number of items) and the mechanical counters of the menu item memories MIM are advanced one step.

The logic sequence for one operation is as follows:
(7B) Items are in the memory so the Schmitt trigger TG8 is in its inversion state—gate AG6 is enabled (the second input from the scanner is also enabled). The emitter-follower AMP10 output from this gate enables the appropriate price line in the decimal to binary diode matrix PBM. The existence of an enabling level on the output lines L1 to L8 of that matrix is the means by which the following binary to decimal converter or decoder BDC is caused to initiate the first round of computation. This is accomplished by the BDC Schmitt inverter SI which comprises the diode matrix sampler DMS of FIGS. 4A–B. The operation of this inverter on the output gate 2 of the binary to decimal converter is discussed in the aforementioned Mahoney patent, but works in the following manner:

If no signals are on any matrix output line, the Schmitt inverter SI is inhibited, thereby closing AND gate AG21. The presence of a price signal on the matrix will enable SI. The other input to gate AG21 is the inversion output of the one-shot 3 msec. delay generator DG36, and this enable signal is available at all times except for a 3 msec. Interval after the binary to decimal converter BDC finishes its computation. The reason for the existence of DG36 will be discussed in its proper location.

(8B) The enable of AG21 through trigger TG6 triggers a 33 msec. delay generator DG35 and at the end of this interval a pulse is passed from trigger TG7 to the DG1 of the binary to decimal converter BDC to start its conversion cycle.

The same pulse steps up the ring counter in item quantity accumulator IQA and also steps up the mechanical ring counters in the menu item memory MIM. The menu item memory can only step at the rate of 15 steps per second, and in order to accommodate this the item quantity memory count rate must be limited to 65 msec. This is the reason for the existence of the two monostable multivibrator delay generators DG4 (33 msec. delay) and DG35 (33 msec. delay). As a one-shot multivibrator minimum recovery time is 10 percent of the delay interval, a single 65 msec. multivibrator could not be successfully commanded to operate for 6 msec. after each activation. The actual demand time for the computer could be as short as 4 msec. (a 5¢ item—5 pulses at 200 μsec., plus the 3 msec. delay of DG36). In order to have the multivibrator circuit available for readdressing in less than the recovery interval, it is standard practice to split the time delay between two generators in cascade, each being fully recovered before the tandem delay period is ended.

(9B) The binary to decimal conversion method used in the computer is fully explained in the aforementioned W. J. Mahoney, patent 3,197,762 and will not be repeated. At the end of one burst of decimal pulses, the equivalent of the price of one single item entered in the item quantity memory, a conversion completed signal is sent out from the flip-flop FF1 in the converter. This triggers the delay generator DG4—Shockley one-shot trigger TG5—which in turn, after 33 msec., tries to fire the Shockley one-shot trigger TG14 in all the item quantity memory IQM circuits 1 through 30. However, all TG14 circuits except the one presently under control of the given scanner stage are inhibited from firing by the follower clamp (semiconductor multivibrator as disclosed in the copending U.S. application of W. J. Mahoney, Ser. No. 181,336, filed March 21, 1962 and now Patent No. 3,231,786) piloted from the nonenergized scanner steps.

The TG14 which is active, fires to step backward the bidirectional ring counter used in the item quantity memory circuit by one count. Assuming that a quantity greater than one item was in the ring counter, the inversion output of Schmitt trigger TG8 will remain, and the associated diode line of the price bank matrix PBM is still energized.

The firing of the trigger TG14 also sends a signal to the binary to decimal converter BDC through the chain TG38, DG36, AG21, DG35, TG7 to command the subsequent round of conversion. A new train of decimal pulses is thereby sent to the price accumulators.

Under this step 9B, at the completion of the first conversion sequence, the pulse that returns from the converter through the 33 msec. delay generator DG4 and the trigger TG5 also sets the flip-flop FF11 to its PRINT COMMAND position. This conditions the gating network AG13 and OR gate OG2 into Schmitt trigger (restorer) TG41 and delay generator DG3 so that printing of the item total price will take place when the item quantity memory signifies the end of its final multiplication sequence by stepping to the 0 position.

The sequence of events under 9B is repeatedly undertaken as long as items remain in the bidirectional ring counter BRC of IQM.

(10B) When the final item in the given memory stage has been converted to decimal pulses and entered into the price bank accumulators, the bidirectional counter BRC of the item quantity memory IQM which had been on stage 1, is stepped backward once more by the signal passed back from the binary to decimal converter BDC through DG4, TG5 and TG14.

As the bidirectional counter steps to its 0 stage, Schmitt trigger TG8 is enabled, removing the inversion signal and energizing the normal output. This enables gate AG5 (whose second input is already conditioned by the scanner stage through AMP8) and a signal is sent through the follower AMP11 to the PRINT COMMAND gating network AG13 (FF11 is still enabling the second input of this gate). Schmitt trigger TG41 and delay generator DG3 act upon this signal to energize flip-flop FF15, the item total price and item quantity accumulator gating control. The signal from DG3 also, through OR gate OG4, triggers the 100μ sec. delay generator DG5, and after this interval, which allows the item total price and item quantity gates to stabilize, the PRINT COMMAND signal is passed through flip-flop FF16 to the printer. It is seen that both gating and printing signals are controlled by flip-flops. This allows these two control signals to be continually presented to the printer until the printer has completed its action and returns the STATUS signal. The STATUS signal, acting upon the item accumulator reset system (DG11–DG12) resets both the flip-flop FF15 and FF16, removing the two control levels, and resets the ring counters of the item total price accumulator ITP and the item quantity accumulator IQA back to 0.

The amplifier AMP4, driven by flip-flop FF15 is the gating amplifier referred to in the discussion of the price accumulators and item quantity accumulator.

When printing of quantity and price information is completed, and before the STATUS signal is returned, the printer automatically shifts the bill by one space, thereby being in register for the next PRINT or ADVANCE computer command. Return of the STATUS signals does not cause a new LINE ADVANCE even though DG30 is triggered as the scanner is not resting on a stage which is connected to the spacing bus SB.

Returning now to the beginning of the 10B sequence, where the bidirectional counter BRC in the item quantity memory IQM had been stepped to 0 by a signal from the binary to decimal converter BDC. It was shown that, when that counter reached 0, the signal level was removed from the price bank matrix PBM. The removal of the matrix energization disables sampler Schmitt inverter SI of the BDC converter, shutting the AND gate AG21. Thus, no further triggering can pass to the generator DG35 to intiate additional computation by the binary to decimal converter BDC.

It will now be shown that such a trigger would pass through if this gating arrangement was not employed. When the last signal from the converter BDC stepped the bidirectional counter BRC of the item quantity memory IQM back from 1 to 0 by activating trigger TG14, the TG14 output also came back to the converter input line, as is usual for all stepping operations. In the absence of AG21, locking up against this signal, the convert command would have passed. The 3 msec. delay generator DG36 ensures that the diode matrix gates and sampler SI have sufficient time to stabilize at the disable condition before the compute command signal originating in the one-shot trigger arrives at the gate AG21. The Schmitt trigger TG38 which triggers the DG36 generator is a D.C. level-sensing circuit to clean up the deteriorated triggering pulse which is the result of thirty TG14 units tied together in the OR gating configuration. The computer has now completed the action required by the first item quantity memory IQM. It was seen that two modes of operation were possible: Condition A: Steps 7A and 8A, with no quantities entered for the item—no computation, but a LINE ADVANCE signal only was given to allow bill spacing; Condition B: Steps 7B, 8B, 9B, 10B, found a quantity entered in the item memory and proceeded to multiply by a series of addition steps—a burst of decimal pulses for each digit in the item memory. The item quantity was stepped up to allow printing of the quantity, and the back-ordering equipment was also informed of the quantity.

The computer is now ready to act upon the second item.

(11) When the printer P completed its action on the quantity and price information of Item 1, it sent a STATUS signal to the item quantity reset circuit. The clear generator of this circuit resets FF11 and, via TG2, DG31—Shockley one-shot trigger TG5, moved the scanner IS to Step 3, which is connected to Item 2.

(12) The scanner IS finally reaches the last stage connected to an item memory (Stage 31) by the described sequence of events and then is stepped to stage 32, a spacing step to permit an unprinted line following the items. As the stage is connected to the spacing bus SB, at the end of the 400µ sec. delay of DG30, a signal is passed to the LINE ADVANCE trigger TG40 and the printer is caused to move one space.

(13) In the computer models without tax provision both Stages 33 and 34 are tied to the spacing bus, which initiates a LINE ADVANCE without printing.

(14) The scanner IS now Steps to Stage 35, the total running price position. Here the action is as before, with the total running price accumulators TRP being gated and the position is printed. The returning STATUS signal steps the scanner again, to Position 36.

(15) Positions 36 through 44 are bill spacing stations only, provided for the purpose of advancing the paper out to its full length before cutting. The spacing bus-LINE ADVANCE, STATUS return routine is used for this group of steps.

(16) When the scanner reaches Stage 45 the system reset circuit is triggered. System reset performs the following functions:
 (a) Initiate the paper cutting guillotine.
 (b) Clear and reset scanner to 0.
 (c) Clears and resets total running price accumulator TRP to 0.
 (d) Reset flip-flop FF20, restoring order circuits and disconnecting printer STATUS signal line from computer by disabling gate AG23.

The computer has completed its action and is ready for new information to be presented.

A circuit arrangement for producing back-order signal information from the system of the invention is shown in FIG. 29 which it comprises a main menu item memory (MIM) driver amplifier time-shared with a parallel arrangement of the MIM ADD coils of the item quantity memories 1 to 30 each connected in series with an individual MIM conditioner AMP2 for a different one of the commodity items 1 to 30 and controlled from the transistor follower AMP8 of the item quantity memory IQM. The parallel arrangement supplies a common 25 msec. pulse to the selected MIM ADD coil from the MIM driver amplifier AMP1 which is controlled by a 5 msec. pulse supplied from a Shockley trigger TG7 of the command logic. This circuit arrangement operates as an electromechanical bidirectional counter. The MIM driver amplifier AMP1 is disclosed in the aforementioned application of W. J. Mahoney, Serial No. 181,337, and the MIM conditioner AMP2 is disclosed in the co-pending application of M. Felcheck, Serial No. 184,766, filed April 3, 1962.

MENU ITEM MEMORY (MIM)

*(Refer to FIGS. 29 and 30)*

The menu item memory (MIM) is a differential bi-directional electromechanical counting device with provisions for two input signal impulses. One input will cause the MIM to count up and the other to count down with zero as the counter reference number. The counter can therefore count from zero up to 999, or from zero back down from 999 through to 1. Associated with the counting wheels are two separate sets of electrical contacts, one set to control sending back order signals to a food dispensing (assembling or fabricating) machine which it controls and the other set to control an alarm, or warning signal.

Referring to FIG. 30, the first set BOC of contacts of the MIM, for producing back order signals, are designed to remain closed.

From the number 1 through the number 99 inclusive will open on all remaining numbers from 100 to 999 and zero.

The MIM will normally remain at zero position when it is not requiring to be produced food from machine DM which is controls and, in this position, contact BOC will be open. This contact, when closed, will energize a relay KA in machine DM to start the machine to dispense food items and continue to dispense these items until the KA relay is de-energized. Each time machine DM dispenses an item, a pulse is sent to the MIM subtract input circuit. Closing of the MIM manual subtract button MSB energizes the MIM subtract coil MSC and the inventory counter IC from a 24 volt D.C. power supply PS. The closing of the item subtract button SUB in the associated computer C energizes the MIM subtract coil MSC from the power supply PS, but not the inventory counter IC. The closing of dispenser switch DS in the dispensing machine DM energizes the MIM subtract coil MSC and the inventory counter IC from the power supply PS. The 10 minute variable timer VT is for heavy order anticipation before orders are actually placed.

If 7 items were required, ADD button of computer C is pressed 7 times. The computer would memorize this number 7 and after processing, would enter 7 impulses into the add input (ADD coil) ASC of the MIM, which had been resting at zero, would count up to number 7, thus closing the set of back order contacts BOC to then energize the KA relay in the food dispensing machine DM, causing it to start making or dispensing food items. Each time a food item was produced, an impulse would be entered into the subtract input (subtract coil) of the MIM, causing count down, one number for each item produced. When 7 items have been made, the MIM then would be counted down to zero and the contacts BOC would open, de-energizing the KA relay, thereby causing the food dispensing machine to turn off.

The second set of contacts ADS close from numbers 100 through 899 and is only an alarm circuit. If the DM is not able to keep up with demand, in other words, if the MIM has orders entering into its add input faster than the machine can produce orders and subtract the MIM over a period of time, the MIM will continue to count up and the back order quantity will become very high which will not be quickly satisfied. The alarm contacts ADS will close when the MIM count has reached 100 or more. This alarm could be an audio AA or visual alarm VA, or a combination, signaling for assist or the machine by other means. For each item so produced, a manual subtract button on the MIM will be pressed to subtract one number.

Not a part of the MIM, but associated with it in operation, is an inventory counter IC which receives an impulse from the machine DM, each time a food item has been produced, to cause it to count up 1 number only, never count down. In addition, the inventory counter IC can also receive impulses from the power supply PS through closure of the manual push button MPB located on the MIM if the food dispensing machine is being aided by a chef. Thus, at the end of a day or other time period, the inventory counter IC will indicate the total number of food items produced automatically and/or manually.

A 10 minute variable timer VT, which may be of any standard type, is used to order a number of food items in anticipation of a demand in excess of the capabilities of the machines. The timer VT has a set of normally open contacts TS which close when the timer is set for operation. Since contacts TS are connected in parallel with the BOC contacts, closure of contacts TS will cause KA relay to become energized and the food dispenser DM, therefore, will begin to dispense food items as long as the timer VT is operating. Each item produced by the machine DM will pulse the inventory counter up 1, and count the MIM down by 1. Eventually, the MIM may be indicating, for example, the number 980. Since the MIM had been counting downward through zero, this number is equivalent to minus 20 indicating that 20 food items had been produced without being ordered by the normal MIM back ordering process. When the anticipated customers place their orders for this item, these orders are entered into the computer C in a normal fashion. The computer C will then place these orders into the MIM add circuit, causing it to count up and approach 000 on the indicator. Since the MIM contacts, for controlling the KA relay, are open on all numbers other than 1 through 99, the food dispenser DS will not make any further items and food items which have accumulated during the pre-order period will be served.

The food dispensing machines or apparatus controlled or operated by the back order signals produced by the system of the invention may include a machine for cooking or deep frying, of the type disclosed in the U.S. application of Dimitri G. Soussloff, Serial No. 83,984, filed January 23, 1961, now abandoned; and/or a machine capable of automatically handling, cooking and dispensing food, of the type disclosed in the U.S. Patent 3,152,535 to Philip Pollak, Jr., and Herman L. Tiedemann, issued October 13, 1964.

PRICE BANK SELECTOR

(FIG. 23)

As previously described in connection with the diode matrix PBM, the D.C. output level of each item quantity memory gate AG6 through emitter-follower AMP10, is converted by a diode matrix PBM into corresponding binary code.

An adjustable price bank selection system is provided to changeably assign predetermined price values, in 5¢ increments to $2.00, to each item of the item quantity memories (IQM) #1 to 30 by means of movable shorting pins (these values are not an inherent limitation to the system; pennies may be assigned by means of additional connections in the diode matrix PBM).

As shown in FIGURE 23, a selector board SB has a shorting pin SP to connect an item quantity memory IQM to a selected price in the diode price bank matrix PBM. Ii this example, AMP10 of item quantity memory IQM1 is permanently connected to the Y line connecting bus at the right edge of the selector board SB, and the 5¢ price line to the diode matrix is connected to the first X line bus. Pin SP is inserted in the board SP, completing the electrical circuit between the 1st Y but and 5¢ X bus so the D.C. output level from AMP10 Item 1 is directed to the 5¢ line of the diode matrix PBM which feeds line L1 logic inverter I1 and line L3 logic inverter I3 of the binary to decimal converter BDC.

The selector board SB is of the type disclosed in U.S. Patent No. 3,027,534 and provides 1200 connection points (30 items by 40 prices).

APPLICATION TO AUTOMATED RESTAURANT OF DRIVE-IN TYPE

FIG. 24 shows the layout of a typical automatic drive-in type restaurant equipped in accordance with the present invention. As indicated, the console is located in a main restaurant area and has wire connections to an adjacent printer, and to an automatic kitchen for controlling menu item memory devices which, in turn, control the machines therein. Each of the food dispensing machines, as well as the printer is located near a main counter for the trays on which will be assembled the food items to be eaten on the premises or taken out on each order.

As indicated, the console has phone or intercom connections with the customers' stations respectively located in booths in the dining room and in the parking lot. Each of the parking lot booths will contain suitable food holding means, a loudspeaker and a push button electrically connected with a lamp indicator on the operator's keyboard at the console station.

COMMUNICATION SYSTEM

(FIGS. 2, 3, 24 and 25)

In addition to its capability to automatically order, price, and prepare bills, the system also provides for communication between the operator and remotely located customers.

The present arrangement provides for 20 telephone and 60 loudspeaker stations. All telephone stations are located at the booths in the dining room except one which is for take-out orders by restaurant employees having bills each automatically marked with an X in the take-out box.

All loudspeaker stations are located in the parking lot ordering stations except one which is located in the kitchen for employee ordering.

A customer will signal the console operator as follows:

In the dining room, the phone is used to talk to the console operator and in the parking lot, the button located in the center of the loud speaker unit is pressed momentarily. In either case, a red light will glow on the console station light panel and the customer station location originating the call, will be identified by the number engraved on the illuminated station light.

Before a typical customer call is described, other components of the communication system in the console will be discussed.

There are provisions for two operators at the console, one is the main console order operator and the other is an auxiliary, required only when the main operator is unable to handle a rush. An intercommunication amplifier is provided for each operator, each having its own volume control and push-to-talk buttons. The main intercom amplifier is normally used by the console operator for communication with all customer stations via the illuminated station selector buttons. The other auxiliary intercom amplifier is normally used by the auxiliary operator who can communicate with any customer station by use of a patch board and plug arrangement, similar to a telephone patch board, which consists of pairs of telephone jacks and numbered signal lights corresponding and being connected to the console station push buttons.

The main console operator may use either the console loud speaker or a headset. The auxiliary operator can only use a headset with the auxiliary intercom system.

Both intercom amplifiers operate in the same manner and have a spring return push-to-talk button control. When the button is not pushed, the customer is heard by the operator who depresses the push-to-talk button to talk to the customer.

Provision is made for attracting attention at a customer station, when the receiver is on its hook. To do this, the main console operator first presses the desired station button then the ring-back button momentarily to cause a loud tone from the telephone earpiece. This ring-back signal is provided for the telephone stations only. The auxiliary console operation has this facility also.

During lull periods, the console operator may decide to leave the console and will first depress a maintained button labeled Service Tone on the console. At this time, use of a telephone or loud speaker station will cause a pulsating tone to come from the console loud speaker and alert the console operator who will return to the console and depress the lit station button to disable pulsating tone. The service tone also may be disabled by again depressing the service tone maintained button.

Background music preferably is provided by conventional means to the dining room and all outside loud speaker stations. In the drive-in restaurant in which the system of the invention was used, the dining room has four loud speakers at strategic locations.

A typical customer call from the parking lot will proceed in the following manner. After parking at a station, a customer will decide on the number of each item on the menu to be ordered and the loud speaker unit is taken from its support into the car. The customer will then press the button on the speaker unit momentarily.

A short time later, the console operator will ask the customer for his order which will be verbally given through the loud speaker. After the customer has finished giving his order and has had it verified by the console operator, the speaker is replaced. From the console operator's end, the above described customer communication will take place as follows:

A button on the station location panel will light up. The console operator, when free from other communications, will press the lit station button which will change from red to green. The console operator will then depress the console push-to-talk button, request the order and release the push-to-talk button to receive the order from the customer which is entered by use of the item order buttons. After the customer's order has been taken completely, the menu order button is pressed. The green station light will now go out, and the order will be processed. The console operator is now ready to receive another customer order.

Customer orders from telephone stations are processed in exactly the same manner except that the customer has no call button to press. When the phone is removed from the hook, a red station light will automatically appear on the console panel.

If the background noise level at the console is high, the console operator may prefer to use the headset which, when plugged into its jack on the side of the console desk, automatically cuts out the console loud speaker.

In the event that the main console operator is busy, the second, auxiliary operator can take orders by use of another headset and the auxiliary intercom amplifier. In addition, a panel with phone jacks and red lights is provided corresponding to each of the console station location buttons.

When the auxiliary operator is connected to another customer station the red light for such station will disappear on the auxiliary as well as the main station button panel. The auxiliary operator will write the customer's order on an order pad which is given to the main console operator who will then punch in the order on the console buttons.

If the main intercommunication amplifier should fail, the main console operator can switch the auxiliary intercom amplifier to the main communication system by depressing the button marked Spare Amplifier. The defective amplifier is automatically removed from the circuit and, at such time, an auxiliary operator will not be able to assist in order taking. Establishment of communication between the console and a customer speaker station automatically discontinues background music if it is being provided at such station.

INTERLOCKING BETWEEN COMMUNICATIONS AND COMPUTER

The communications system, besides providing communication between the operator and customer further provides for station identification information, take-out and no charge information and an interlock to enable the computer.

The station location of the customer in contact with the operator is automatically printed on each bill and such information is presented to the computer whenever a station location button is depressed. Station location buttons 80 and 81 are "no charge" stations and depressing either one will disable the pricing in the computer. Take-out information is entered by a take-out button or automatically by contact with station 79. The interlock prevents entering information before a customer is contacted.

STATION IDENTIFICATION INFORMATION (*FIGURE 26*)

To present station location information to the computer, a station selector button is depressed which latches in a relay and through a normally open contact (K2C) provides a ground signal to a line feeding the station identification matrix.

The ground signal is provided through gate G32 which is keyed from the ZERO stage of the scanner IS to provide a path to ground. With the scanner not on its ZERO position, gate is open and no station identification information is presented to the computer.

The output of the station identification matrix is connected to columns 4 and 5 of the printer. The manner in which a single ground signal provides station information will now be discussed.

Three typical station connections are shown in FIG. 27. Assume station 80 has its K2C relay closed so that line 80 has a ground signal. The tens wheel, line 8 will have a path to ground through diode $D_1$ and the units wheel, line 0 will have a path to ground through diode $D_2$. The printer now has the proper information to print 80 in columns 4 and 5 and needs only a print command (which is provided by the compute command) to do so.

TAKE OUT INFORMATION

When the order is for "Take-Out" an X is printed in the upper left of the bill. There are two ways to program the computer to indicate a "Take-Out" order. Station 79 is a take-out station and when the button therefor is depressed, a ground signal is transmitted to set flip-flop FF14 so the X line in column 1 will be activated in the printer. For any station except 79, a take-out button on the front panel is depressed to "set" FF14 (FIG. 12B). The X is printed in column 1 at the same time station location information is printed in columns 4 and 5. Flip-flop FF14 is reset by the item accumulator circuit to wipe out take-out information after being printed.

NO CHARGE INFORMATION

Stations 80 and 81 are used by the operator for spillage or free lunch for the employees, respectively. By depressing either of the station selector buttons, a ground signal is sent to FF17 corresponding to FF13 in the system shown and described in the aforementioned patent to William J. Mahoney, which acts to disable Schmitt trigger TG37 through AND gate AG22 in the converter so no information is presented to the accumulators. All other functions of the computer remain the same, the bill being printed with station location and quantity information, but no prices.

ENABLE INTERLOCK

The computer is provided with an interlock so no information can be entered and no bill can be processed until the operator is in contact with a station. All front panel switches except reset switches are disabled unless a station location button has been depressed and a relay locked in. In FIG. 28 is shown a typical switch attached to the interlock circuit.

Both transistor TR1 and switch K2A must be conducting for switch S-1 to provide the trigger circuit with a ground signal. Transistor TR1 is part of the address enable amplifier AEA, which is a solid state switch controlled by flip-flop FF20. Switch K2A is normally open which is closed whenever a station location relay is latched in.

After information is entered into the computer and a "Compute Command" is given, no information can be entered until the bill is completed. This is accomplished through the action of TR1 which is caused to open by FF20 during the computation cycle. FF20 is set by the compute command. At all other times, TR1 is closed since FF20 is reset at the end of the computation, and K2A determines the enabling.

A customer contacts the console operator by pressing the loud-speaker button or by removing the phone from its hanger which cause the customer red light relays K1 (FIG. 25) to hold in and the corresponding station button on the console to light up red. When the console operator presses a red station button, relay K1 will be de-energized and relay K2 energized changing the red light to green. Relay K2, when energized will also switch the background music off, if on, switch in the intercommunication amplifier for order taking and cause the station location to be printed out on the bill via the station identification matrix.

The console operator can now communicate with the green light station by pressing a press-to-talk button. The order is then entered into the computer by pressing each item button the correct number of times. The computer will memorize each item and the number thereof, and compute all prices which will be channeled to the printer where a pre-printed bill will be processed. This information is presented to various MIM back order counters for ordering the required items.

To make an announcement throughout the restaurant, the operator depresses the all-call button to connect the intercom amplifier to the loud-speaker power amplifier and all loud-speakers will carry the announcement.

OVERALL SYSTEM

*(FIGURE 24)*

Very briefly, the communication picture is as follows:

A customer can call the console operator from a car parked in the lot or from a dining room booth. The console operator will select a customer, take his order via an intercom system, and enter the order into the console by depressing the item buttons. The computer will signal each MIM (menu item memory) for each item and number thereof desired, entering back orders. Each MIM will then signal the associated machine as to the number of items required. After the machine has dispensed the required number of items, such information is provided to its MIM, now satisfied, signals the machine to stop.

Simultaneously, the computer will automatically remember each item and its quantity ordered, compute all prices and automatically cause this information to be printed out by the associated printer on a pre-printed bill.

As the items are dispensed from the machines to the assembly area, they are assembled with the printed bill on a tray and taken to the station indicated on the bill.

COMPUTER MANUAL OPERATION

*(FIG. 3, FIG. 25 and FIG. 30)*

If a breakdown should occur in the computer causing it to become inoperative, a manual mode of operation is provided until a repair can be effected. This is done by setting the "Automatic-Manual" selector, located inside the console to manual.

When manual operation is in effect, the printer will be disabled and handwritten bills will be required. Normal communications from the console to the various stations normally will not be affected.

Manual operation will be as follows:

Customer-console operator contact is established in the same manner as during automatic operation and the operator will write numbers in the quantity column for quantities of each item desired. After ordering, the operator will repeat the order back to the customer, make required changes and, finally, press the manual reset button to break off communication. The console operator will now order each item by pressing the item ADD button as many times as necessary causing the following things to happen:

The item ADD order button will now directly cause the menu item memory (MIM) to count up and the machine, controlled by this particular MIM, will now proceed to dispense one item at a time causing the MIM to count down. When the MIM count reaches zero, the machine shuts off. Each time the MIM counts down one number an inventory counter IC will count up one number.

In the event the operator orders too many of a particular item, the subtract (SUB) order button is pressed to count the MIM down but not affect the inventory counter IC which is counted down only by its associated dispensing machine.

When demand is so great that a machine falls behind a counter chef can aid the machine manually to help reduce the back-order. For each item manually produced, the chef will press the button on that item MIM so counter MC will subtract its count by one number, and the inventory counter IC will increase its count by one number. The inventory counter IC will always indicate the quantity of a particular item dispensed, either manually or automatically produced.

In the case of certain items which take longer to make, a variable electric timer, with a range of one to ten minutes, is connected to the MIM. Thus, if a large demand is anticipated, the timer can be set to the number of minutes desired. For example, suppose that a machine can dispense one item every six seconds. This is at the rate of ten per minute. If sixty items are the anticipated demand, the timer will then be set to six minutes shortly before the demand expected so the anticipated items will be ready and waiting. It may be desirable to calibrate the timer in item quantities, rather than in minutes, at a future time.

Various modifications of the various features of the system which have been illustrated and described which are within the spirit and scope of the invention will occur to persons skilled in the art.

What is claimed is:

1. In combination in an ordering, price computing and billing system, a control station including a computer having a multistage scanner, a printer operated from the output of said computer, a plurality of customer ordering stations each including individual station control means and an individual station relay having contacts, the contacts of all of the relays being connected in parallel, a station identification diode matrix connected to said printer, a gate circuit controlled by said scanner and adapted to be closed when said scanner is in its zero stage position, means responsive to the operation of the station control means at one of said customer ordering stations by the customer thereat to cause signals to be applied through said gate circuit, when it is closed by said scanner, and said station identification matrix to said printer causing it to print on the customer's bill the location of said one station.

2. In combination with an ordering and pricing system, a plurality of sources of signals respectively representing information on the quantity of different commodity items ordered on the same order, a diode matrix respectively presenting at its various diode terminals any predetermined different total price within a given range possible for the quantity of any of said items on an order and an adjustable price selection device comprising two groups of rows of electrically-connected conductive sockets extending lengthwise in different parallel planes, each of the sockets in the rows of one group being aligned with one of the sockets in the rows in the second group, a common input bus for the rows in said one group permanently connected to a different one of said sources, a common output bus for the rows in said second group permanently connected to respective diode terminals in said diode matrix which present a different predetermined total price within said given range, and a conductive shorting pin which when connected to join any aligned sockets in the two groups completes an electrical connection between said input and output bus thereby providing a means for assigning any predetermined price value within the given range of the diode matrix to each of said commodity items.

3. In combination in an ordering and indicating system, a plurality of memory devices with associated order controls, one such device for each of a number of items of predetermined price values available for ordering, each of said memory devices comprising a first multiposition bidirectional ring counter with an associated trigger means connected to a pair of said order controls, each of said trigger means causing the associated first ring counter to step up one position to order one item when one of said pair of order controls connected thereto is operated and to step down one position to cancel on ordered item when the other of said pair of order controls is operated so the resultant stepping of the associated first ring counter provdies a voltage at its output representing the quantity of items ordered, accumulator means connected to said memory devices and comprising a second ring counter responsive to the output voltages of all of said first ring counters to accumulate and store quantity information on each of the ordered, indicating means responsive to the stored quantity information for indicating this information, said order controls including an order menu control for operation when the entry by operation of the other of said order controls is complete and confirmed by a customer, and pulse generating means associated with said order menu control and activated thereby when operated to produce a command pulse for activating the computer to perform its computing functions and for disabling all of said pairs of order controls.

4. The combination of claim 3, in which electronic gating means connects the output of each said first counter to said indicating means, the absence of a direct current level in the output of each first counter at its zero position stage, as other stages are energized, being used to open or close said electronic gating means to allow or prevent transmission of the quantity information to said indicating means.

5. The combination of claim 3, in which a visual readout device having a plurality of different numerals representing different quantities of input information, is connected to the output of each first counter, the voltage in the output of the said first counter at any time being used to energize the appropriate numerals in said visual readout device to indicate the quantity information to the customer.

6. In combination in an ordering, price computing and billing system, a computer including a plurality of item quantity memory devices with associated keying controls, one for each of a number of different commodity items of predetermined price values available for ordering, and adapted to produce and store an output signal representing information on the quantity of its particular item entered therein by operation of one of the associated controls by the operator of the system, if ordered on a particular order from a customer, scanner means for sampling the output signals of all of said memory devices in sequence to determine those in which orders have been placed, means for sequentially converting the sampled signals first into binary price information and then into equivalent trains of decimal pulses the number of which in each train represents the total price of a different one of the items on the order, accumulator means fed from the signal output of each of the memory devices in which orders have been placed and the decimal pulse output of the converting means for respectively accumulating and storing information on the quantity of each of the items, the item total price and the total running price of the order and means for visually indicating the accumulated and stored information to a customer, and wherein said means for converting the sampled signals into binary price information includes a diode matrix adapted to invert decimal information into binary form and provide at its diode terminals information representing any predetermined price possible for the ordered items on a single order, and each of said memory devices comprises a multi-position, bidirectional ring counter, with associated order controls including an ADD control means, and the total item price for any quantity of an item ordered is provided and encoded by the operator by operating the ADD control means a number of times equal to the quantity of that item ordered to advance the associated ring counter to a correspondingly numbered output position, and when the ring counter steps itself back to zero units after such operation, the total price for that quantity of the item is effectively entered in binary form in said diode matrix an equal number of times.

7. In combination in an ordering, price computing and billing system, a computer including a plurality of item quantity memory devices with associated keying controls, one for each of a number of different commodity items of predetermined price values available for ordering, and adapted to produce and store an output signal representing information on the quantity of its particular item entered therein by operation of one of the associated controls by the operator of the system, if ordered on a particular order from a customer, scanner means for sampling the output signals of all of said memory devices in sequence to determine those in which orders have been placed, means for sequentially converting the sampled signals first into binary price information and then into equivalent trains of decimal pulses the number of which in each train represents the total price of a different one of the items on the order, accumulator means fed from the signal output of each of the memory devices in which orders have been placed and the decimal pulse output of the converting means for respectively accumulating and storing information on the quantity of each of the items, the item total price and the total running price of the order and means for visually indicating the accumulated and stored information to a customer, and wherein said accumulator means includes output gating means, the total running price portion of said accumulator means being normally gated to read out its price information to said printer under control of said scanner means through said output gating means, and includes means responsive to the ungated output of said total running price portion for stored information therein reaching a selected high price value for disabling the input to said output gating means for that information, whereby operation of said printer to print price information above said given price value is prevented.

References Cited by the Examiner

UNITED STATES PATENTS

| | | | |
|---|---|---|---|
| 2,407,411 | 9/1946 | Folis | 340—286 |
| 2,528,394 | 10/1950 | Sharpless et al. | 235—92 X |
| 2,597,538 | 5/1952 | Skillman et al. | 235—92 |
| 2,627,224 | 2/1953 | Wolf | 235—92 X |

ROBERT C. BAILEY, *Primary Examiner.*

MALCOLM A. MORRISON, *Examiner.*

I. S. KAVRUKOV, E. M. RONEY, *Assistant Examiners.*